United States Patent
Aoshima et al.

(10) Patent No.: US 7,192,153 B2
(45) Date of Patent: Mar. 20, 2007

(54) LENS, LIGHT IRRADIATION APPARATUS, AND LASER POINTER

(75) Inventors: Masayoshi Aoshima, Miyagi (JP); Kyu Kanno, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/835,669

(22) Filed: Apr. 30, 2004

(65) Prior Publication Data

US 2004/0227998 A1 Nov. 18, 2004

(30) Foreign Application Priority Data

May 12, 2003 (JP) ............................ P2003-133559

(51) Int. Cl.
*F21V 33/00* (2006.01)
(52) U.S. Cl. ...................... 362/109; 362/257; 362/293; 362/311; 362/361
(58) Field of Classification Search ................ 362/109, 362/257, 259, 293, 311, 335, 361, 455
See application file for complete search history.

(56) References Cited

U.S. PATENT DOCUMENTS

| | | | | |
|---|---|---|---|---|
| 5,418,810 A | * | 5/1995 | Eguchi et al. ................. | 372/98 |
| 5,654,831 A | * | 8/1997 | Byren et al. ................. | 359/718 |
| 5,673,083 A | * | 9/1997 | Izumi et al. ................. | 348/340 |
| 5,774,271 A | * | 6/1998 | Lagerway et al. ........... | 359/649 |
| 6,191,894 B1 | * | 2/2001 | Kitamura et al. ............ | 359/676 |
| 6,654,112 B2 | * | 11/2003 | Noguchi et al. ........... | 356/237.3 |
| 2002/0139661 A1 | * | 10/2002 | Ando et al. ............. | 204/192.12 |

FOREIGN PATENT DOCUMENTS

| | | |
|---|---|---|
| JP | 04-362608 | 12/1992 |
| JP | 07-318554 | 12/1995 |

* cited by examiner

*Primary Examiner*—Sandra O'Shea
*Assistant Examiner*—Mark Tsidulko
(74) *Attorney, Agent, or Firm*—Sonnenschein Nath & Rosenthal, LLP

(57) ABSTRACT

A lens, a light irradiation apparatus and a laser pointer to which the lens is applied to are provided, in which eccentricity, discrepancy of light axes, uneven gap of lens surfaces and the like are reduced without performing positioning of respective lenses; and cost of manufacturing a lens having a plurality of functions can be reduced.

A lens according to the present invention is the lens, in which a light diameter expanding element for expanding a diameter of incident light and a light collimating element for projecting approximately collimated light after receiving the incident light having the diameter thereof expanded by the light diameter expanding element are integrally formed in advance as a lens of one unit. According to such lens, it is possible to control occurrence of the eccentricity, the discrepancy of light axes and the uneven gap of lens surfaces due to a positioning discrepancy between respective lenses, in comparison to a lens wherein a lens as the light diameter expanding element and a lens as the light collimating element are individually formed and are combined into one body.

8 Claims, 12 Drawing Sheets

A: Without Black Coating
B: With Black Coating

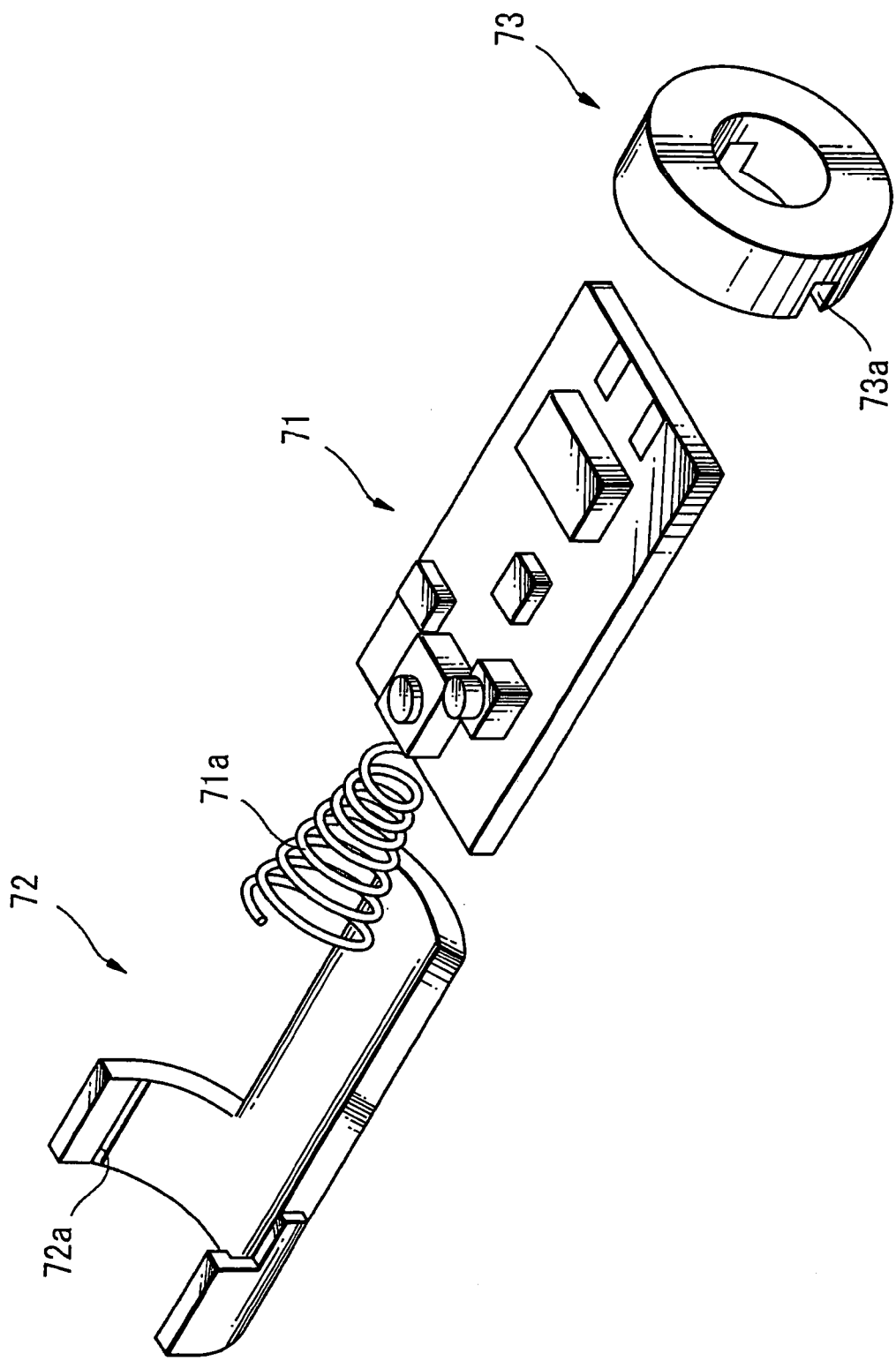

LENS, LIGHT IRRADIATION APPARATUS, AND LASER POINTER

BACKGROUND OF THE INVENTION

1. Field of the Invention

The present invention relates to a light irradiation apparatus and a laser pointer which are provided with a light emitting module as a light emitting element to convert a wavelength of emitting light, and in particular to a light irradiation apparatus and a laser pointer provided with a laser light emitting module using a laser diode. Further, the present invention relates to a lens suitable for use in those light irradiation apparatus and laser pointer.

2. Description of the Related Art

In order to point a reference part in a presentation, a labeler for construction, a marker for apparels, a marker for assemblies and the like, pointers which irradiate a spot light are used. Those pointers have specific characteristics capable of pointing even from a position distant from a pointing object to some extent, because those pointers point at a relevant portion by using light, and also capable of being handled easily, because those pointers are smaller than rod-type pointing apparatuses. In order for a user to point an aimed area regardless of distance to an object irradiated with light, light projected from a pointer needs to be approximately collimated light and laser light is suitable to be used.

Further, in order to point the area aimed by the user and also to improve visibility with respect to the pointed area, laser light emitted from the light source, the diameter of which can be expanded to be irradiated onto a certain area, is required, and a pointer capable of projecting laser light, which is approximately collimated and has an expanded diameter, has been desired.

Thus, in order to project laser light which is approximately collimated and has an expanded diameter, there is required a lens having multiple functions such as expanding the diameter of laser light projected from the light source and making the laser light approximately collimated.

Conventionally, a lens having multiple functions has been formed by combining with high accuracy a plurality of lenses which have individual functions respectively, and a combined lens is well known, in which for example each lens is joined with adhesive or the like while performing a positioning so as to eliminate eccentricity, discrepancy of light axes, and an error in gap of surfaces between the plurality of lenses (refer to, for example, patent reference 1).

[Patent Reference 1]

Japanese Laid-open Patent Application No. 10-123388

However, although complicated and highly precise processing has become possible with the progress in molding technology, there has been a problem that a yield rate becomes low when manufacturing a lens having multiple functions as described above, because there is a case where a positioning error of lenses, that is eccentricity, discrepancy of light axes, and an uneven gap of lens surfaces occur at the time of combining the plurality of lenses which are individually formed.

In addition, in order to improve yield rate, it is possible to increase a positioning accuracy of manufacturing apparatus to combine the plurality of lenses; however, the manufacturing process of combining the plurality of lenses becomes complicated and at the same time, it also leads to an increase in manufacturing cost.

Further, it is also possible to improve a processing accuracy of respective lenses which are combined and to add a mechanism of adjusting the eccentricity, the discrepancy of light axes, the uneven gap of lens surfaces and the like to a lens holder in which those lenses are accommodated, however it causes an increase in manufacturing cost of the lens to be combined, an increase in number of parts, and an increase in processing cost.

Moreover, incident light which enters a combined lens composed of a plurality of lenses is affected by errors caused by the eccentricity, the discrepancy of light axes and the uneven gap of lens surfaces whenever entering respective lenses, and it has been difficult to accurately expand the diameter of incident light to be projected as approximately collimated light.

Accordingly, it is an object of the present invention to provide a lens, in which eccentricity, discrepancy of light axes, uneven gap of lens surfaces, and the like can be reduced without performing the positioning of respective lenses and there is no increase in manufacturing cost of a lens having multiple functions, and to provide a light irradiation apparatus and a laser pointer to which the lens is applied.

SUMMARY OF THE INVENTION

A lens according to the present invention includes: a light diameter expanding means for expanding a diameter of incident light to be projected; a light collimating means for receiving the light having its diameter expanded by the above light diameter expanding means to project approximately collimated light; and a lens unit in which the above described light diameter expanding means and light collimating means are integrally formed. According to the lens of the present invention, since the light diameter expanding means and the light collimating means are not separately prepared to be combined into one body, it is possible to control occurrence of eccentricity, discrepancy of light axes, and error in gap of lens surfaces due to a positioning discrepancy between the light diameter expanding means and the light collimating means, and it is possible to provide an integrally formed lens having two functions such as expanding the diameter of light and collimating light. Moreover, in comparison to a case in which a lens having the light diameter expanding means and a lens having the light collimating means are joined with adhesive to form one body while adjusting with high accuracy relative positions thereof, a manufacturing process can be simplified, which also leads to reduction in manufacturing cost. Further, the number of parts can be reduced, because the diameter of incident light is expanded to project approximately collimated light using one piece of lens.

In the lens according to the present invention, at least either of the above described light diameter expanding means and light collimating means may be formed by processing a lens unit so as to have predetermined curvatures on light incident side and on light emitting side of the above described lens unit, respectively. According to such lens, by forming the light diameter expanding means on the light incident side of the lens unit in advance and further forming the light collimating means on the light emitting side, it is possible for one piece of lens to expand the diameter of light to be collimated and emitted as the approximately collimated light.

Further, in such lens, the above described predetermined curvatures may be adjusted so that a focal point of the above described light diameter expanding means and a focal point of the above described light collimating means can be set to the approximately same point. In such lens, dispersion in refractive indexes of the light diameter expanding means and the light collimating means is rarely observed, because the light diameter expanding means and the light collimating means are formed with the same material. Accordingly, it is possible to accurately expand the diameter of incident light and to emit approximately collimated light only by adjusting the respective curvatures of the light diameter expanding means and the light collimating means.

In the lens according to the present invention, the above described light diameter expanding means can be a concave lens and the above described light collimating means can be a convex lens, for example. According to such lens, it is possible to expand the diameter of light using the concave lens to emit approximately collimated light using the convex lens, so that approximately collimated light, the diameter of which is expanded compared to the incident light, can be emitted using one piece of lens. Moreover, by forming the concave lens and the convex lens, distance between lens surfaces can be made shorter in comparison to a case in which two pieces of convex lens are formed, and the whole lens can be small-sized.

Further, in the lens according to the present invention, the above described light diameter expanding means can be a convex lens and also the above described light collimating means can be a convex lens, for example. According to such lens, the light path of incident light is intersected by the convex lens to expand the diameter of light and the light having the expanded light path can be emitted as approximately collimated light by the convex lens. Moreover, when a polishing process is required, a convex lens can be formed easily in comparison to a concave lens and therefore, it is possible to simplify a manufacturing process and to reduce manufacturing costs.

Furthermore, in the lens according to the present invention, the above described lens unit may be provided with a light reflection preventing means for reducing diffused reflection of light, the diameter of which is expanded by the above described light diameter expanding means. By reducing the diffused reflection of the incident light passing through the lens using such light reflection preventing means, it becomes possible to control a distribution range of light intensity when approximately collimated light emitted from the lens is irradiated on an object. Accordingly, visibility can be enhanced without having an irradiated area blurred.

In such lens, the above described light reflection preventing means may be a light absorption member. According to such light absorption member, reflection of light can be reduced and a distribution range of light intensity can be reduced by absorbing the light which is the cause of expanding the distribution range of light intensity.

Further, in such lens, the above described light absorption member can be formed on a circumferential surface of the above described lens unit and on the incident side of the lens unit where the above incident light enters the above lens unit. According to such light absorption member, it is possible to reduce the reflection of light in the lens unit and it is possible to irradiate approximately collimated light even onto a distant object by projecting the approximately collimated light, the diameter of which expanded.

In the lens according to the present invention, the above described lens unit may include an optical filter to select a wavelength of the above described light. According to such optical filter, it is possible to select the wavelength of light emitted from the lens as approximately collimated light, and the light having a required wavelength can be irradiated on an object.

In such lens, the above described optical filter also can shield infrared light. According to such optical filter, only visible light can be emitted as approximately collimated light from the lens by shielding unnecessary infrared light which is invisible, and it is possible to irradiate light of high safety without disposing a filter separately.

In the lens according to the present invention, the above described incident light may be approximately collimated light. According to such lens, it is possible to expand the diameter of approximately collimated light emitted from a light source to be emitted as approximately collimated light having a larger diameter.

In such lens, the above described approximately collimated light may be laser light. According to such lens, it is possible to emit the laser light that is coherent light having the diameter thereof expanded as approximately collimated light and an object to which the approximately collimated light is irradiated can be illuminated with light of predetermined color.

A light irradiation apparatus according to the present invention includes: a light emitting means for emitting light; a light diameter expanding means for expanding the diameter of light emitted from the above described light emitting means to be emitted; a light collimating means for receiving the incident light, the diameter of which is expanded by the above described light diameter expanding means and emitting approximately collimated light; and a lens having a lens unit in which the above described light diameter expanding means and light collimating means are integrally formed. According to such light irradiation apparatus, it is possible to collimate and emit light having the diameter thereof expanded. Further, the light diameter expanding means and the light collimating means are integrally formed in the lens unit, so that it is possible to simplify a manufacturing process of the light irradiation apparatus in comparison to a case where the light diameter expanding means and the light collimating means are individually formed to be combined, which also leads to reduction in manufacturing costs.

Further, in such light irradiation apparatus, the above described light projecting means can be a laser light emitting module which projects laser light. According to such light irradiation apparatus, it is possible to expand the diameter of laser light projected from the laser light emitting module to be projected as approximately collimated light.

Furthermore, in such light irradiation apparatus, the above described laser emitting module may includes: a solid-state laser medium; a non-linear optical element which converts a wavelength of light emitted from the above solid-state laser medium; a resonator consisting of a pair of resonance reflective portions between which the above described solid-state laser medium and non-linear optical element are held so as to make light back and forth; a laser diode which emits light to excite the above solid-state laser medium; and a window cap in which a window portion is formed to take out the light projected from the above described resonator, and the above described resonator and the above described laser diode are accommodated. According to such light irradiation apparatus, a group of elements for emitting laser light is accommodated in the window cap, so that dust is prevented from adhering to the laser diode or the resonator. Accordingly, handling becomes easy when mounting the laser light emitting module on electronic equipment and further, it becomes possible to attain an improvement in reliability of the laser light emitting module and longer operating life thereof. In addition, an airtight member, which transmits light and maintains air-tightness, is attached to the window portion and the air-tightness is maintained inside the window cap, so that dustproof effect can be further enhanced.

The light irradiation apparatus according to the present invention may include a lens holder to accommodate the above described lens, and the above lens holder can be provided with a light reflection preventing means for reducing diffused reflection of light projected from the above described light diameter expanding means. According to such lens holder, by reducing the diffused reflection when incident light passes through the lens, a distribution range of light intensity can be reduced when approximately collimated light projected from the lens is irradiated on an object, so that the visibility is enhanced.

According to such light irradiation apparatus, the above described light reflection preventing means can be a light absorption member which is formed inside the above described lens holder. According to such lens holder, it is possible to eliminate light causing expansion of a distribution range of light intensity of approximately collimated light projected from the lens. Accordingly, it becomes possible to irradiate the approximately collimated light even on a distant object.

Further, in the above light irradiation apparatus, by adjusting an area, which the above described light absorption member covers, of a circumferential surface of the above described lens unit, the light intensity distribution of light projected from the above described lens can be adjusted. According to such light irradiation apparatus, an amount of light to be absorbed into the light absorption member can be adjusted, and the light intensity distribution on an object which is irradiated by the light projected from the light irradiation apparatus can be adjusted.

Moreover, in the light irradiation apparatus according to the present invention, by adjusting an area of the above described window portion, the light intensity distribution of light projected from the above described lens can be adjusted. According to such window portion, the light intensity distribution of incident light which enters the lens can be adjusted, and the light intensity distribution on an object which is irradiated with the light projected from the light irradiation apparatus can be adjusted.

In the light irradiation apparatus according to the present invention, the above described lens unit can be provided with an optical filter which selects a wavelength of light projected from the above described window portion. According to such optical filter, a wavelength of light projected as approximately collimated light from the lens can be selected, and light having a required wavelength can be irradiated on an object.

In such light irradiation apparatus, the above described optical filter can also shield infrared light. According to such optical filter, only visible light can be projected as approximately collimated light from the lens thereof by shielding unnecessary infrared light which is invisible, and it becomes possible to irradiate light of high safety without disposing a filter separately.

A laser pointer according to the present invention has: a laser light emitting module which includes a solid-state laser medium, a non-linear optical element to convert a wavelength of light emitted from the solid-state laser medium, a resonator consisting of a pair of resonance reflective portions between which the solid-state laser medium and the non-linear optical element are held so as to make light back and forth, a laser diode to emit light so as to excite the solid-state laser medium, and a window cap in which a window portion is formed to take out light projected from the above resonator, and the above resonator and the above laser diode are accommodated; and a lens which expands the diameter of light projected from the above window portion so as to make approximately collimated light. The above described lens has: a light diameter expanding means for expanding the diameter of light projected from the above window portion to be projected; a light collimating means for receiving the incident light the diameter of which is expanded by the light diameter expanding means and projecting approximately collimated light; and a lens unit in which the above described light diameter expanding means and light collimating means are integrally formed. According to such laser pointer, a group of elements to emit laser light is accommodated in the window cap, so that dust can be prevented from adhering to the laser diode or the resonator. Therefore, handling becomes easy when mounting the laser light emitting module on electronic equipment, and further it becomes possible to attain improvement in reliability of the laser light emitting module and longer operating life thereof. In addition, it becomes possible to further enhance a dustproof effect by attaching to the window portion an airtight member which transmits light and maintains an air-tightness so as to maintain the air-tightness inside the window cap. Moreover, by using a lens in which the light diameter expanding means and the light collimating means are integrally formed, it is possible to simplify a manufacturing process of the laser pointer, and manufacturing cost thereof can be reduced.

BRIEF DESCRIPTION OF THE DRAWINGS

FIGS. 1A and 1B are diagrams showing an outer appearance of a lens according to a first embodiment of the present invention, in which FIG. 1A is a rear view showing the lens from the side where an incident light enters and FIG. 1B is a lateral view showing the side of the lens;

FIGS. 3A and 3B are diagrams showing an outer appearance of a lens according to a second embodiment of the present invention, in which FIG. 3A is a rear view showing the lens from the side where incident light enters and FIG. 3B is a lateral view showing the side of the lens;

FIGS. 5A and 5B are diagrams showing an outer appearance of a lens according to a third embodiment of the present invention, in which FIG. 5A is a rear view showing the lens from the side where incident light enters and FIG. 5B is a lateral view showing the side of the lens;

FIGS. 6A and 6B are diagrams showing another example of an outer appearance of the lens according to the third embodiment, in which FIG. 6A is a rear view showing the lens from the side where incident light enters and FIG. 6B is a lateral view showing the side of the lens;

FIG. 15 is an exploded perspective view showing a structure of a driver portion.

DESCRIPTION OF THE PREFERRED EMBODIMENTS

Hereinafter, detailed explanations are made with respect to a lens, a light irradiation apparatus, and a laser pointer according to the present invention by referring to the accompanied drawings. First, the lens according to the present invention is explained and successively, a laser pointer is explained as an example of a light irradiation apparatus to which the present invention is applied.

[First Embodiment]

A lens according to the first embodiment of the present invention includes: a light diameter expanding means for expanding the diameter of incident light to be projected; a light collimating means for receiving incident light the diameter of which is expanded by the light diameter expanding means to project approximately collimated light; and a lens unit in which the light diameter expanding means and the light collimating means are integrally formed; and the lens has a concave lens portion as the light diameter expanding means and a convex lens portion as the light collimating means.

Figures 1A, 1B:
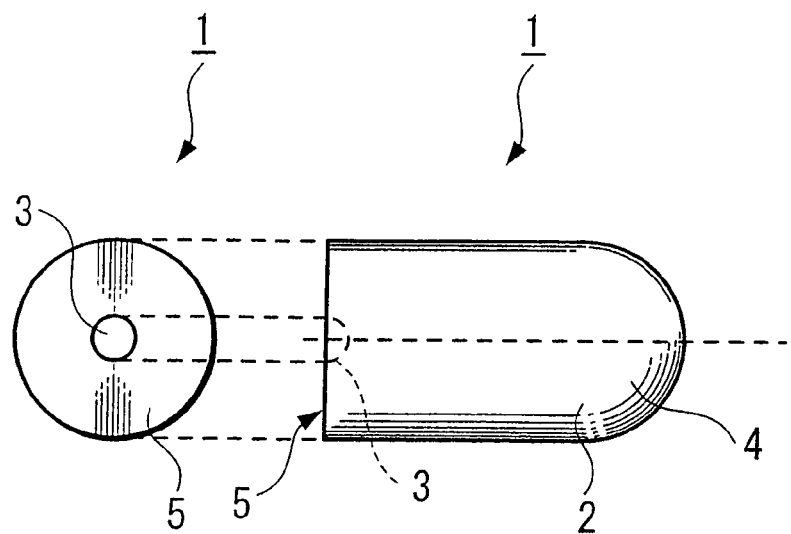

FIG. 1 is a schematic view showing a structure of a lens according to the embodiment, wherein FIG. 1A is a rear view showing a lens 1 from the side where incident light enters and FIG. 1B is a lateral view showing the side of lens 1. As shown in FIGS. 1A and 1B, the lens 1 is composed of a lens unit 2, a concave lens portion 3 and a convex lens portion 4, and has an approximately cylindrical shape.

The concave lens portion 3 is formed on the incident side where the incident light enters the lens 1. The concave lens portion 3 is a concave lens directly formed in the lens unit 2 and constitutes the lens 1 integrally formed with the lens unit 2 and the convex lens 4. Accordingly, it is possible to simplify a manufacturing process of producing a concave lens and a convex lens in comparison to a case in which a lens is formed by joining individually produced concave lens and convex lens to be combined into one body with adhesive. Further, it is possible to reduce joining surfaces, where the concave lens and the convex lens are joined with adhesive, with forming the concave lens portion 3 and the convex lens portion 4 in the lens unit 2. In other words, it becomes possible to reduce reflection of light at those joined surfaces and to efficiently project the incident light entered the lens 1. For example, in case that an optical system is composed of two pieces of lens, boundary surfaces of respective lenses to the outside are to be four surfaces; however, the boundary surfaces can be two by integrally forming a concave lens and a convex lens, so that loss caused by the reflection of light on the surface of the lens can be reduced. Furthermore, since a manufacturing process is unnecessary in which individually produced concave lens and convex lens are combined into one body while performing a positioning thereof, it is also possible to form one piece of lens 1 having respective functions of a concave lens and a convex lens without requiring an adjustment with high accuracy of eccentricity, discrepancy of light axes, and an uneven gap of lens surfaces between the concave lens and the convex lens.

The concave lens portion 3 is formed in an end surface 5 of the lens unit 2 to have a predetermined curvature by a processing method conventionally used when processing an optical lens. Further, when organic polymer material such as glass or plastic is used as an optical material constituting the lens 1, it is possible to form the lens 1 with high accuracy, in which the concave lens portion 3 and the convex lens portion 4 are integrally formed by high-precision processing of a mold for forming the optical material into the shape of lens and by management of molding conditions. Accordingly, when a concave lens and a convex lens are produced very accurately, it is possible to reduce eccentricity, discrepancy of light axes, and uneven gap of lens surfaces which occur in case of forming a lens by combining those lenses to become one body. Further, according to the lens 1 in which the concave lens portion 3 and the convex lens portion 4 are formed integrally in the lens unit 2, it is unnecessary to individually adjust a curvature of each lens in response to dispersion in refractive index of the concave lens and the convex lens which are formed individually.

Moreover, the lens 1 can also be provided with an optical filter which absorbs light of a specific wavelength. By using a material which absorbs the light of specific wavelength as the material to form the lens 1, it is possible to project light having the light of specific wavelength removed as approximately collimated light from the lens 1. Particularly, by forming the lens 1 with a material used in an IR cut filter to remove infrared rays (IR) or the like, infrared light projected from a later described SHG laser light emitting module consisting of a laser diode, a solid-state laser, and a non-linear element can be absorbed. Accordingly, unnecessary infrared laser light which is invisible and unrecognizable can be removed by the lens 1 and safety can be secured without disposing the IR cut filter separately. Furthermore, it is also possible not to project the light of specific wavelength by coating at least either of the concave lens portion 3 and the convex lens portion 4 with the material which absorbs or does not transmit the above described light of the specific wavelength.

The concave lens portion 3 is formed approximately in the center of the end surface 5 such that in the lens unit 2 a light axis of the concave lens portion 3 and a light axis of the convex lens portion 4 coincide with each other. The concave lens portion 3 may be either a spherical surface lens or a non-spherical surface lens as long as it is a concave lens capable of refracting incident light to expand the diameter thereof. Further, the concave lens portion 3 is formed in a part of the end surface 5 which is the side where incident light enters. Furthermore, curvature of the concave lens portion 3 is adjusted to correspond to curvature of the convex lens portion 4 so that the diameter of incident light is expanded to be projected from the convex lens portion 4 as approximately collimated light having a light path approximately parallel to light axes of the concave lens portion 3 and convex lens portion 4. The curvature of concave lens portion 3 is adjusted so that a focal point of the concave lens portion 3 and a focal point of the convex lens portion 4 coincide with each other, and light the diameter of which is expanded by the concave lens portion 3 can be projected from the convex lens portion 4 as approximately collimated light.

The convex lens portion 4 is formed on the projecting side where light the diameter of which is expanded by the concave lens portion 3 is projected from the lens 1 as approximately collimated light. Approximately collimated light projected from the convex lens portion 4 has a light path approximately parallel to the light axes of the concave lens portion 3 and the convex lens portion 4. The convex lens portion 4 is a convex lens directly formed in the lens unit 2, in which the lens unit 2 and the convex lens portion 4 are integrally formed.

The convex lens portion 4 is formed on the opposite side to the end surface 5 of the lens unit 2 so as to have a predetermined curvature by a processing method conventionally used at the time of processing an optical lens. Also, the convex lens portion 4 can be formed together with the concave lens portion 3, when the concave lens portion 3 is formed in the lens unit 2. Accordingly, it is possible to simplify a manufacturing process of producing a concave lens and a convex lens in comparison to a case in which a lens is formed by joining individually produced concave lens and convex lens to be combined into one body with adhesive. Furthermore, reflection of light can be reduced at joining surfaces where the concave lens and the convex lens are joined with adhesive, and approximately collimated light can be projected efficiently without attenuating the incident light.

The convex lens portion 4 is formed in the whole end portion of the lens unit 2, and the light axes of the concave lens portion 3 and convex lens portion 4 coincide with each other. The convex lens portion 4 may be formed partially in the central part of the end portion of the lens unit 2 as long as a necessary effective diameter can be secured. Also, the convex lens portion 4 may be either a spherical surface lens or a non-spherical surface lens as long as it is a convex lens capable of projecting light the diameter of which is expanded by the concave lens portion 3 as approximately collimated light. Furthermore, curvature of the convex lens portion 4 is adjusted to correspond to curvature of the concave lens portion 3 so that light the diameter of which is expanded by the concave lens portion 3 can be projected as approximately collimated light.

Figure 2:
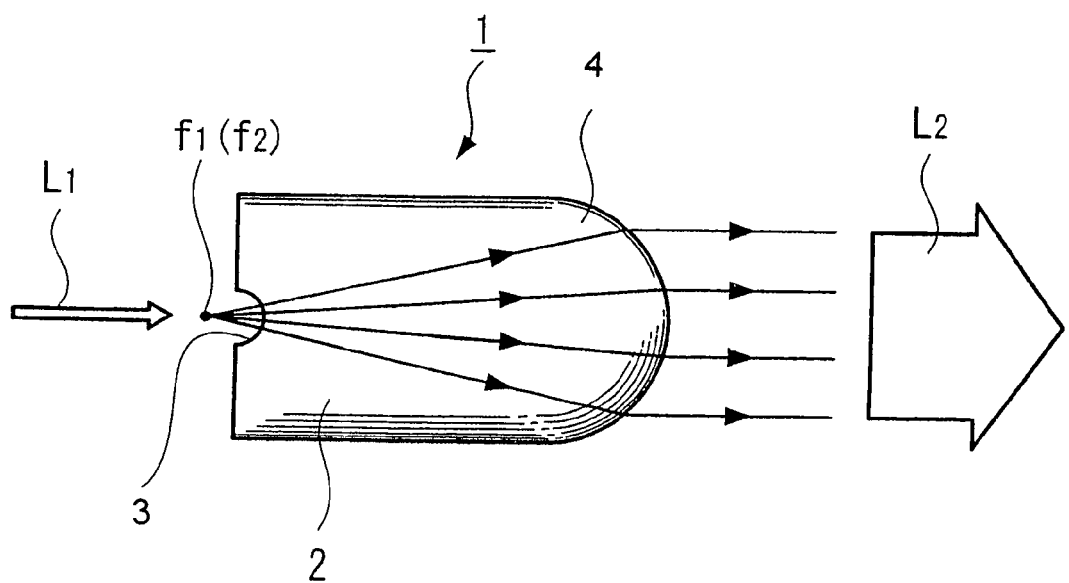
FIG. 2 is a diagram explaining a light path in which the diameter of incident light is expanded by the lens to be projected as approximately collimated light.

FIG. 2 is a diagram explaining a process in which the diameter of incident light $L_1$ is expanded by the lens 1 and projection light $L_2$ is projected as approximately collimated light.

As shown in FIG. 2, the lens 1 is a lens in which the diameter of incident light $L_1$ is expanded to be projected as approximately collimated light, and according to this embodiment, the incident light $L_1$ is light having a light path approximately parallel to the light axes of the concave lens portion 3 and convex lens portion 4. The lens 1 is suitable when expanding the diameter of such incident light $L_1$ to be projected as approximately collimated light.

The incident light $L_1$ is, for example, a laser light; and the lens 1 can expand the diameter of coherent light having a uniform wavelength to be projected as approximately collimated light. Accordingly, the lens 1 can illuminate an irradiation area where approximately collimated light is irradiated with light of predetermined color. The incident light $L_1$ is projected as light having directivity from a light source such as an optical resonator to enter the concave lens portion 3 as approximately collimated light with respect to the light axes of the concave lens portion 3 and convex lens portion 4. Note that the incident light $L_1$ is not limited to laser light as long as it is the light having a light path approximately parallel to the light axes of the concave lens portion 3 and convex lens portion 4 to enter the concave lens portion 3.

The diameter of the incident light $L_1$ is expanded by the concave lens portion 3 to be projected from the convex lens portion 4 as the projection light $L_2$ of approximately collimated light with respect to the light axes of the concave lens portion 3 and convex lens portion 4. Since a focal point $f_1$ of the concave lens portion 3 and a focal point $f_2$ of the convex lens portion 4 approximately coincide with each other with respect to the lens 1 on the entering side of the incident light $L_1$, it is possible to project light the diameter of which is expanded by the concave lens portion 3 as approximately collimated light from the concave lens portion 4. Furthermore, since the focal point $f_1$ of the concave lens portion 3 and the focal point $f_2$ of the convex lens portion 4 approximately coincide with each other with respect to the lens 1 on the entering side of the incident light $L_1$, it is possible to narrow a distance between lens surfaces in comparison to a case in which the diameter of incident light $L_1$ is expanded using two pieces of convex lens to be projected as approximately collimated light. Accordingly, by integrally forming the concave lens portion 3 and the convex lens portion 4 in the lens unit 2, the lens 1 can be small-sized in comparison to a case in which two pieces of convex lens portion are formed in the lens unit 2.

A ratio of the diameter of incident light $L_1$ to the diameter of the projection light $L_2$ can be adjusted based on a ratio of a focal length of the concave lens portion 3 to a focal length of the convex lens portion 4. For example, in case that the incident light $L_1$ having the diameter of 0.2 mm is projected as the projection light $L_2$ having the diameter of 1 mm, the ratio of the focal length of the concave lens portion 3 to the focal length of the convex lens portion 4 may be set to 1:5, because the ratio of the diameter of incident light $L_1$ (0.2 mm) to the diameter of projection light $L_2$ (1 mm) is 1:5.

As explained referring to FIGS. 1 and 2, according to the lens 1 of this embodiment, it is possible to simplify a manufacturing process of producing a concave lens and a convex lens in comparison to a case in which a lens is formed by joining individually produced concave lens and convex lens to be combined into one body with adhesive. Further, reflection of light can be reduced at joining surfaces where the concave lens and the convex lens are joined with adhesive, and incident light entering the lens 1 can be projected efficiently. Moreover, it is possible to form a lens having respective functions of the concave lens and the convex lens without requiring adjustment with high accuracy with respect to eccentricity, discrepancy of light axes, and uneven gap of lens surfaces between the concave lens and the convex lens. Furthermore, since the concave lens and the convex lens are integrally formed, there rarely occur the eccentricity, the discrepancy of light axes, and the uneven gap of lens surfaces between the concave lens and the convex lens which are caused by shock or environmental changes, and the lens is suitable for a portable type light irradiation apparatus such as a laser pointer which is later described, for example.

[Second Embodiment]

A lens according to the second embodiment of the present invention includes: a light diameter expanding means for expanding the diameter of incident light to be projected; a light collimating means for receiving incident light the diameter of which is expanded by the light diameter expanding means to project approximately collimated light; and a lens unit in which the light diameter expanding means and the light collimating means are integrally formed; and the lens has a convex lens portion as the light diameter expanding means and a convex lens portion as the light collimating means.

Figures 3A, 3B:
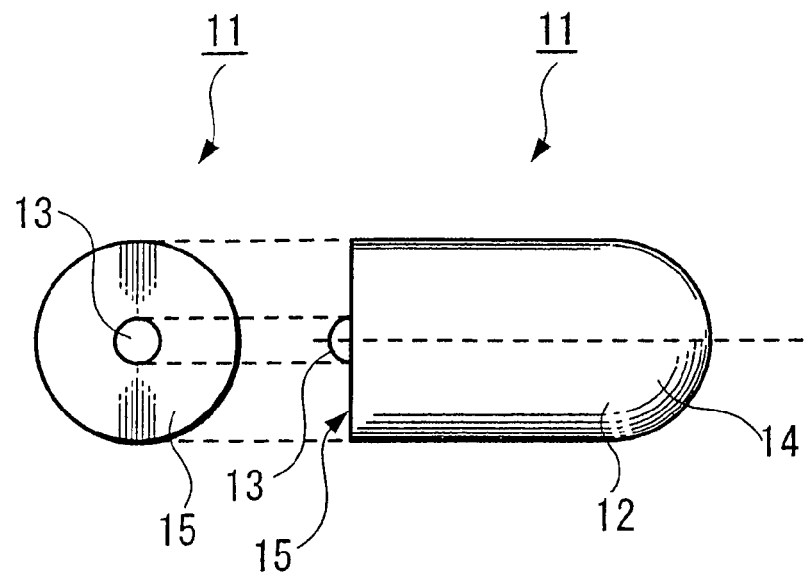

FIG. 3 is a schematic view showing a structure of a lens according to the second embodiment, in which FIG. 3A is a rear view showing a lens 11 from the side where incident light enters and FIG. 3B is a lateral view showing the side of lens 11. As shown in FIGS. 3A and 3B, the lens 11 is composed of a lens unit 12, convex lens portions 13, 14 and has an approximately cylindrical shape.

The convex lens portion 13 is formed on the incident side where the incident light enters the lens 11. The convex lens portion 13 is a convex lens directly formed in the lens unit 12 and constitutes the lens 11 integrally formed with the lens unit 12 and the convex lens portion 14. Accordingly, it is possible to simplify a manufacturing process of producing two pieces of convex lenses in comparison to a case in which the lens is formed by joining individually produced two pieces of convex lenses to be combined into one body with adhesive. Further, it becomes possible to reduce reflection of light at joined surfaces and to efficiently project the incident light entered the lens 11. For example, in case that an optical system is composed of two pieces of lens, boundary surfaces of respective lenses to the outside are to be four surfaces; however, the boundary surfaces can be two by integrally forming two pieces of convex lenses, so that loss caused by the reflection of light on the surface of the lens can be reduced by half. Furthermore, it is also possible to provide one piece of lens 11 with functions obtained by combining two convex lenses without requiring an adjustment with high accuracy of eccentricity, discrepancy of light axes, and an uneven gap of lens surfaces between the two convex lenses.

The convex lens portion 13 is formed in an end surface 15 of the lens unit 12 to have a predetermined curvature by a processing method conventionally used when processing an optical lens. Note that since a material constituting the lens 11 is a similar material to the material which is explained in the first embodiment, a detailed explanation is omitted; however, since the lens 11 is composed of the convex lenses 13, 14 which are formed integrally in the lens unit 12, it is possible to reduce the eccentricity, the discrepancy of light axes and the uneven gap of lens surfaces which occur in case of producing two pieces of convex lens with high accuracy and of forming a lens by combining those lenses into one body. Further, according to the lens 11 in which the convex lens portions 13, 14 are formed integrally in the lens unit 12, it is unnecessary to individually adjust a curvature of each lens in response to dispersion in refractive index of the two pieces of convex lens which are formed individually.

Moreover, the lens 11 can also be provided with an optical filter which absorbs light of a specific wavelength. By using a material which absorbs the light of specific wavelength as the material to form the lens 11, it is possible to project from the lens 11 light having the light of specific wavelength removed as approximately collimated light. Particularly, by forming the lens 11 with a material such as used in an IR cut filter to absorb light in the proximity region of infrared rays, infrared light projected from a later described SHG laser light emitting module consisting of a laser diode, a solid-state laser, and a non-linear element can be absorbed. Accordingly, unnecessary infrared laser light which is invisible and unrecognizable can be removed by the lens 1 and safety can be secured without disposing the IR cut filter separately. Furthermore, it is also possible to coat at least either of the convex lens portions 13, 14 with the material which removes the above described light of the specific wavelength.

The convex lens portion 13 is formed approximately in the center of the end surface 15 such that in the lens unit 12 a light axis of the convex lens portion 13 and a light axis of the convex lens portion 14 coincide with each other. The convex lens portion 13 may be either a spherical surface lens or a non-spherical surface lens as long as it is a convex lens capable of refracting incident light to expand the diameter thereof to enter the convex lens portion 14 with the expanded diameter. Further, the convex lens portion 13 is formed in a part of the end surface 15 which is the side where incident light enters. Furthermore, curvature of the convex lens portion 13 is adjusted to correspond to curvature of the convex lens portion 14 so that the diameter of incident light is expanded to be projected from the convex lens portion 14 as approximately collimated light having a light path approximately parallel to light axes of the convex lens portion 13 and convex lens portion 14. The curvature of convex lens portion 13 is adjusted so that a focal point of the convex lens portion 13 and a focal point of the convex lens portion 14 coincide with each other. Since the light refracted by the convex lens portion 13 has the expanded diameter compared to the incident light when entering the convex lens portion 14, light the diameter of which is expanded can be projected from the convex lens portion 14 as approximately collimated light.

The convex lens portion 14 is formed on the projecting side where light the diameter of which is refracted by the convex lens portion 13 is projected from the lens 11 as approximately collimated light. Approximately collimated light projected from the convex lens portion 14 has a light path approximately parallel to the light axes of the convex lens portion 13 and the convex lens portion 14. The convex lens portion 14 is a convex lens directly formed in the lens unit 12, in which the lens unit 12 and the convex lens portion 14 are integrally formed.

The convex lens portion 14 is formed on the opposite side to the end surface 15 of the lens unit 12 to have a predetermined curvature by a processing method conventionally used at the time of processing an optical lens. Also, the convex lens portion 14 can be formed together with the convex lens portion 13, when the convex lens portion 13 is formed in the lens unit 12. Accordingly, it is possible to simplify a manufacturing process of producing two pieces of convex lens in comparison to a case wherein a lens is formed by joining individually produced two pieces of convex lens to be combined into one body with adhesive. Furthermore, reflection of light can be reduced at joining surfaces where the two pieces of convex lens are joined with adhesive, and approximately collimated light can be projected efficiently without attenuating the incident light.

The convex lens portion 14 is formed in the whole end portion of the lens unit 12, and the light axes of the convex lens portion 13 and convex lens portion 14 coincide with each other. The convex lens portion 14 may be formed partially in the central part of the end portion of the lens unit 12 as long as a necessary effective diameter can be secured. Also, the convex lens portion 14 may be either a spherical surface lens or a non-spherical surface lens as long as it is a convex lens capable of projecting light refracted by the convex lens portion 13 as approximately collimated light. Furthermore, curvature of the convex lens portion 14 is adjusted to correspond to curvature of the convex lens portion 13 so that light refracted by the convex lens portion 13 can be projected as approximately collimated light.

Figure 4:
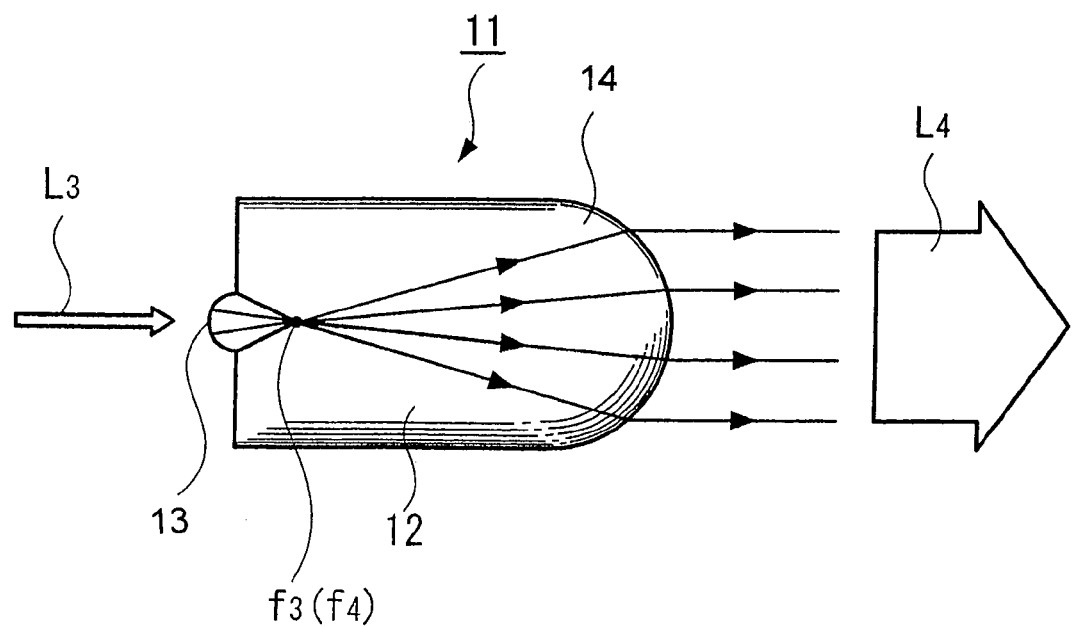
FIG. 4 is a diagram explaining a light path in which the diameter of incident light is expanded by the lens to be projected as approximately collimated light.

FIG. 4 is a diagram explaining a state in which incident light $L_3$ is refracted and is made into approximately collimated light by the lens 11 to be projected as a projection light $L_4$.

As shown in FIG. 4, the lens 11 is a lens which refracts incident light $L_3$ to be projected as approximately collimated light, and according to the embodiment, the incident light $L_3$ is light having a light path approximately parallel to the light axes of the convex lens portions 13 and 14. The lens 11 is suitable when refracting such incident light $L_3$ to be projected as approximately collimated light.

The incident light $L_3$ is, for example, laser light; and the lens 11 can expand the diameter of coherent light having a uniform wavelength to be projected as approximately collimated light. Accordingly, the lens 11 can illuminate an irradiation area where approximately collimated light is irradiated with light of predetermined color. The incident light $L_3$ is projected as light having directivity from a light source such as a laser resonator to enter the convex lens portion 13 as approximately collimated light with respect to the light axes of the convex lens portions 13 and 14. Note that the incident light $L_3$ is not limited to laser light as long as it is the light having a light path approximately parallel to the light axes of the convex lens portions 13 and 14 to enter the convex lens portion 13.

The incident light $L_3$ is refracted by the convex lens portion 13 to be projected from the convex lens portion 14 as the projection light $L_4$ of approximately collimated light with respect to the light axes of the convex lens portions 13 and 14. Since a focal point $f_3$ of the convex lens portion. 13 and a focal point $f_4$ of the convex lens portion 4 approximately coincide with each other in the lens unit 12, the diameter of light refracted by the convex lens portion 13 is once narrowed; however, when entering the convex lens portion 14, the refracted light has the larger diameter compared to the diameter of the incident light $L_4$. The light the diameter of which is expanded in comparison to the diameter of the incident light $L_3$ is projected from the convex lens portion 14 as the projection light $L_4$ which is made into approximately collimated light.

Also, when a polishing process is necessary, it is easier to form the convex lens portion 13 integrally with the lens unit 12 than to form a concave lens integrally with the lens unit 12, and it is possible to reduce aberration of the lens 11 by forming the convex lens portion 13 having curvature adjusted with high accuracy integrally with the lens unit 12. Accordingly, a distribution range of light intensity can be controlled in an irradiation area which is irradiated with the projection light $L_4$ projected as approximately collimated light, and visibility of the irradiated area can be enhanced.

A ratio of the diameter of incident light $L_3$ to the diameter of the projection light $L_4$ can be adjusted based on a ratio of a focal length of the convex lens portion 13 to a focal length of the convex lens portion 14. For example, in case that the incident light $L_3$ having the diameter of 0.2 mm is projected as the projection light $L_4$ having the diameter of 1 mm, the ratio of the focal length of the convex lens portion 13 to the focal length of the convex lens portion 4 may be set to 1:5, because the ratio of the diameter of incident light $L_3$ (0.2 mm) to the diameter of projection light $L_4$ (1 mm) is 1:5.

As explained referring to FIGS. 3 and 4, according to the lens 11 of the second embodiment, it is possible to simplify a manufacturing process of producing two pieces of convex lens in comparison to a case in which the lens is formed by joining individually produced two pieces of convex lens to be combined into one body with adhesive. Further, reflection of light can be reduced at joining surfaces where the two pieces of convex lens are joined with adhesive, and incident light entering the lens 11 can be projected efficiently. Moreover, the lens in which two pieces of convex lens are integrally formed is formed without requiring adjustment with high accuracy with respect to eccentricity, discrepancy of light axes, and uneven gap of lens surfaces between individually manufactured two pieces of convex lens, so that costs of manufacturing the lens can be reduced.

[Third Embodiment]

A lens according to the third embodiment of the present invention includes: a light diameter expanding means for expanding the diameter of incident light to be projected; a light collimating means for receiving incident light the diameter of which is expanded by the light diameter expanding means to project approximately collimated light; and a lens unit in which the light diameter expanding means and the light collimating means are integrally formed, and the lens unit is provided with a light reflection preventing means for reducing diffused reflection of the incident light inside the lens.

Figures 5A, 5B:
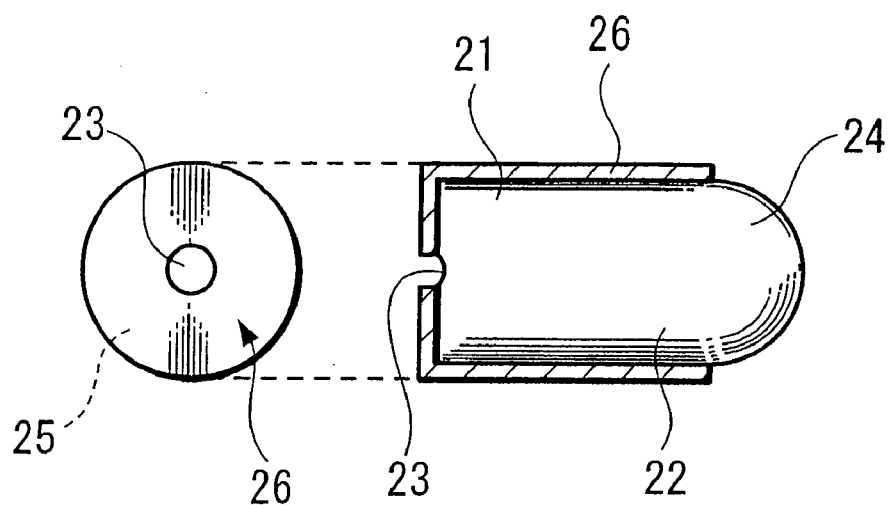

FIG. 5 is a schematic view showing a structure of a lens according to the third embodiment, in which FIG. 5A is a rear view showing a lens 21 from the side where incident light enters and FIG. 5B is a lateral view showing the side of lens 21. As shown in FIGS. 5A and 5B, the lens 21 has an approximately similar construction to that of the lens 1 explained in the first embodiment, so that the detailed explanation of the structure of the lens 21 is omitted.

The lens 21 has a lens unit 22, a concave lens portion 23, and a convex lens portion 24; and is approximately cylindrical-shaped. Further, the lens 21 is provided with a light reflection preventing means 26 for reducing diffused reflection of light inside the lens unit 22 on a circumferential surface and an end surface 25 of the lens unit 22.

The light reflection preventing means 26 is formed around a circumferential surface of the lens unit 22 and further formed to cover the whole end surface 25 other than the concave lens portion 23. The light reflection preventing means 26 reduces diffused reflection of light inside the lens unit 22 and reduces a distribution range of light intensity with respect to projection light which is projected as approximately collimated light having diameter thereof expanded. In other words, the light reflection preventing means 26 reduces expansion of a light path of the light projected from the convex lens portion 24 from an approximately parallel light path with respect to light axes of the concave lens portion 23 and convex lens portion 24. Accordingly, a distribution range of light intensity can be reduced in a light irradiated surface where the light projected from the convex lens portion 24 is irradiated, and a distribution range of the light intensity in an area which is illuminated by the projection light can be controlled.

The light reflection preventing means 26 is a light absorption member which absorbs diffused reflection light inside the lens unit 22. For example, a member colored in black is disposed to cover the circumferential surface of the lens unit 22 and the whole end surface 25 other than the concave lens portion 23. Thus, the light absorption member is disposed on the area excluding the concave lens portion 23 and the convex lens portion 24 of the lens 21, so that approximately collimated light having the reduced diffusion of light intensity distribution can be projected from the lens 21. Moreover, it is also possible to adjust the light intensity distribution of the projection light which is projected from the lens 21 by adjusting the area of the lens 21 covered by the light reflection preventing means 26.

Further, the lens 21 is not limited to the structure explained in this embodiment; and may be a lens, in which two convex lens portions 13 and 14 are integrally formed such as the lens 11 explained in the second embodiment, and the light reflection preventing means may be formed to cover an area excluding the convex lens portions 13 and 14.

Figures 6A, 6B:
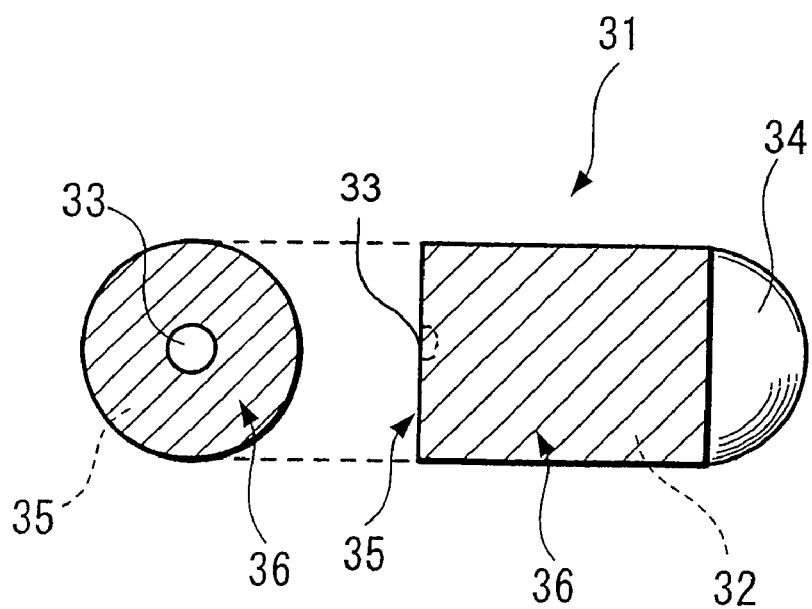

FIG. 6 is a diagram showing another example of a lens according to the third embodiment, in which FIG. 6A is a rear view showing a lens 31 from the side where incident light enters, and 6B is a lateral view showing the side of the lens 31. As shown in FIGS. 6A and 6B, since the lens 31 has an approximately similar construction to the lens 1 explained in the first embodiment, the detailed explanation for the structure of the lens 31 will be omitted.

The lens 31 has a lens unit 32, a concave lens portion 33, and a convex lens portion 34; and has an approximately cylindrical shape. Further, the lens 31 is provided with a light reflection preventing means 36 for reducing diffused reflection of light inside the lens unit 32 on a circumferential surface and an end surface 35 of the lens unit 32.

The light reflection preventing means 36 is formed around the circumferential surface of the lens unit 32 and further, is formed to cover the whole end surface 35 other than the concave lens portion 33. The light reflection preventing means 36 is a light absorption film which is formed to cover the circumferential surface and the whole end surface 25 other than the concave lens portion 33 of the lens unit 22. Such light absorption film is formed, for example, by applying a coating made of black pigment dissolved into an organic solvent on an area other than the concave lens portion 33 and the convex lens portion 34 of the lens 31, and approximately collimated light having a reduced distribution range of light intensity can be projected from the lens 31. Moreover, it is also possible to adjust the light intensity distribution of the light projected from the lens 31 by adjusting the area of the lens 31 covered by the light reflection preventing means 36.

Further, the construction of the lens 31 is not limited to that explained in this third embodiment; but it is also possible to have a structure in which two convex lens portions 13 and 14 are integrally formed such as the lens 11 explained in the second embodiment, and the light absorption film applied with the above described coating to cover the area other than the convex lens portions 13 and 14 can also be used as the light absorption means.

PRACTICE EXAMPLE

Hereinafter, explanation will be made with respect to an experiment conducted to confirm a difference in light intensity distribution depending on either presence or absence of the light reflection preventing means in a lens according to the embodiment of the present invention. Hereupon, black coating is applied to the lens as the light reflection preventing means. In this experiment, a laser light (output: 0.5 mW, wavelength: 532 nm) is made to enter the lens having an approximately similar structure to the above described lens 31 as incident light of approximately collimated light, and a light intensity distribution is measured when projection light is irradiated on a plane one meter away from the lens. The detailed data of the lens used in this experiment are shown in Table 1.

TABLE 1

| Size of Lens | Diameter: „10 mm |
| --- | --- |
|  | Length: 19.8 mm |
| Incident Side Lens Portion | Concave Lens (Curvature: R1.3) |
| Projection Side Lens Portion | Convex Lens (Curvature: R7.8) |
| Refractive Index of Lens | 1.519 |

Figure 7:
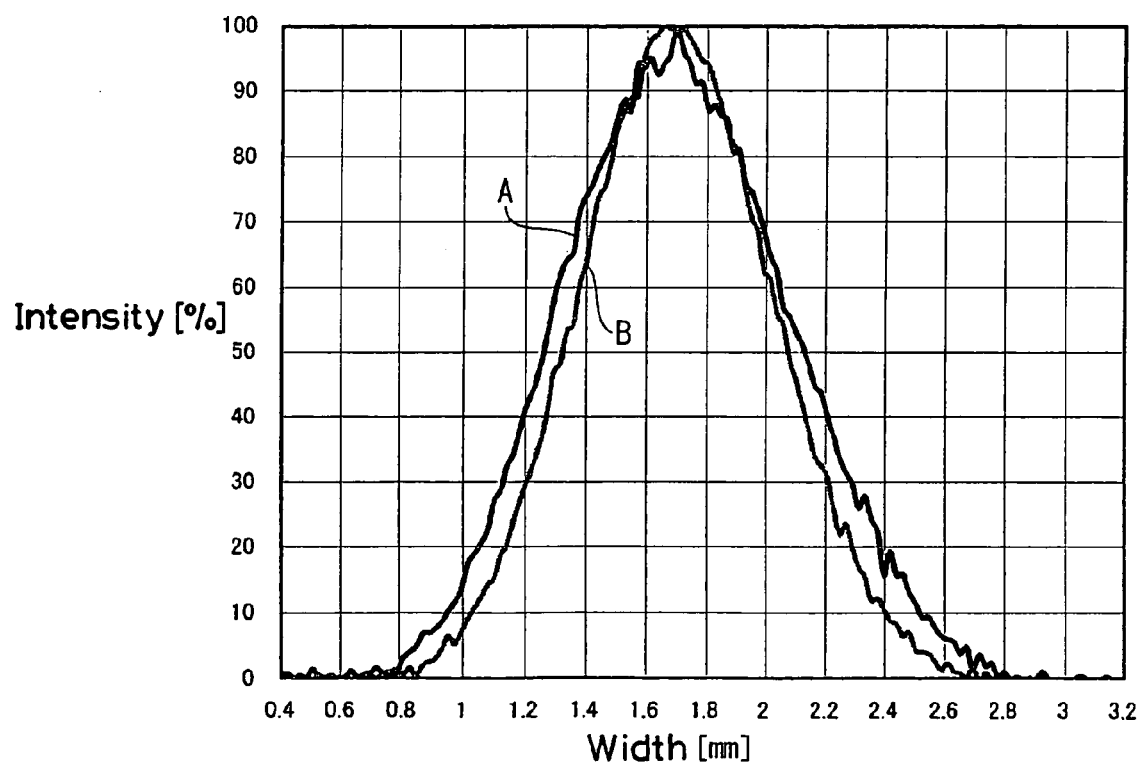
FIG. 7 is a light intensity distribution diagram showing the result of an experiment which is performed using the lens, in which light intensity distributions of a lens with black coating and a lens without black coating are compared.

FIG. 7 is a characteristic curves showing the measurement results of light intensity distribution, in which a light intensity distribution A shows the result when the black coating is not applied to the lens (without black coating) and a light intensity distribution B shows the result when the black coating is applied to the lens (with black coating). As shown in FIG. 7, the light intensity distribution B has restrained light intensity distribution and has a sharp peak in comparison to the light intensity distribution A.

Table 2 shows a rate of decrease in the width of the light intensity distribution B compared to the width of the light intensity distribution A shown in FIG. 7.

TABLE 2

|  | Width of Light Intensity Distribution A (mm) | Width of Light Intensity Distribution B (mm) | Rate of Decrease in Width of Light Intensity Distribution (%) |
| --- | --- | --- | --- |
| ① Light Intensity ($1/e^2$) | 1.43 | 1.22 | 14.7 |
| ② Light Intensity (½) | 0.85 | 0.71 | 16.5 |

As shown in table 2, the width of the light intensity distribution, in which the light intensity becomes $1/e^2$ (about 13.5%) of a peak value, has been narrowed from 1.43 mm to 1.22 mm by applying black coating to the lens and the rate of decrease in the width of the light intensity distribution has been 14.7%. In addition, the width of the light intensity distribution, in which the light intensity becomes ½ (50%) of the peak value, has been narrowed from 0.85 mm to 0.71 mm and the rate of decrease in the width of the light intensity distribution has been 16.5%. Thus, it has been confirmed that the light intensity distribution of approximately collimated light which is projected from the lens can be narrowed by applying black coating on the lens. Accordingly, by providing the lens with the light reflection preventing means, it becomes possible to illuminate a light irradiated surface with approximately collimated light having the narrowed distribution of light intensity and to improve visibility with respect to the irradiated area.

[Fourth Embodiment]

Next, a laser pointer is explained as an example of the light irradiation apparatus to which the lens according to the present invention is applied. Note that the light irradiation apparatus according to the present invention is not limited to the following description, but it is also suitable for an optical analyzer which performs an analysis by irradiating a sample with light having a required diameter and having expansion of a light path controlled, for example, and it can be modified accordingly without departing from the scope and spirit of the present invention.

Figure 8:
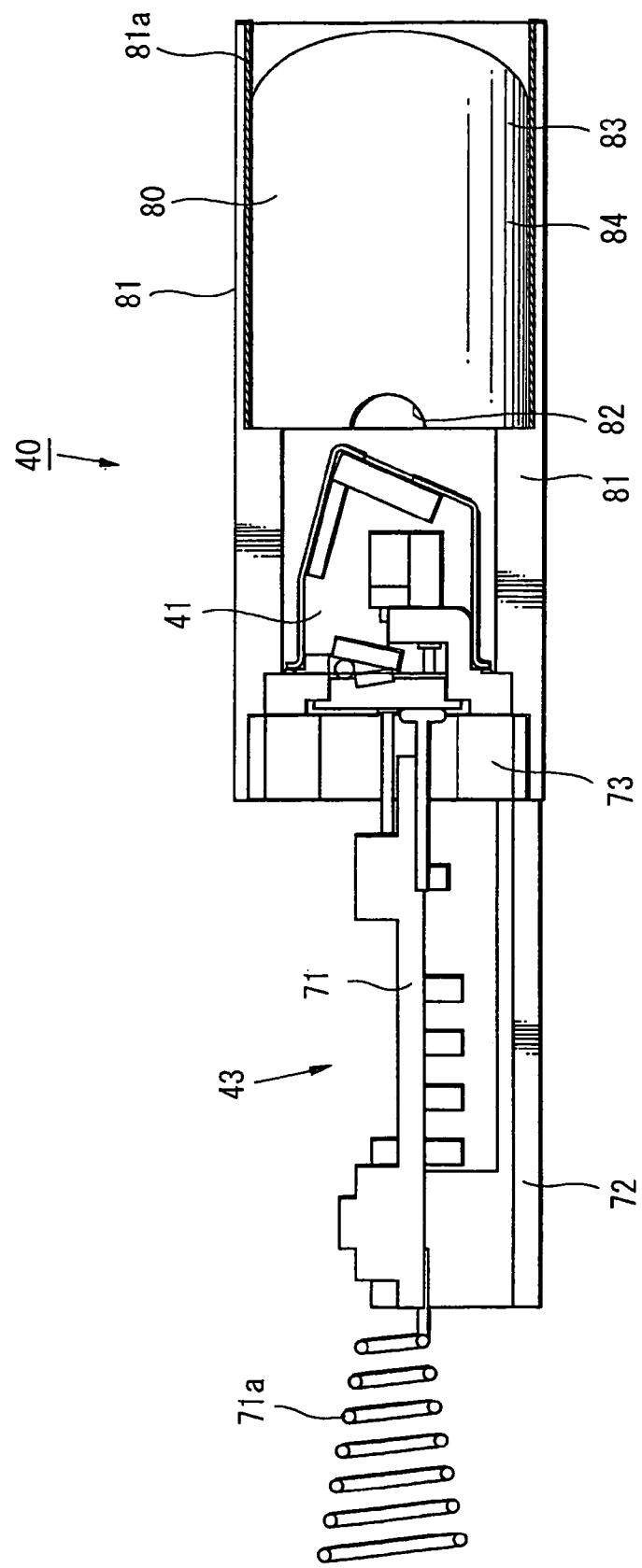
FIG. 8 is a cross-sectional diagram showing a structure of a laser pointer which is an example of a light irradiation apparatus according to a fourth embodiment of the present invention.
Figure 9:
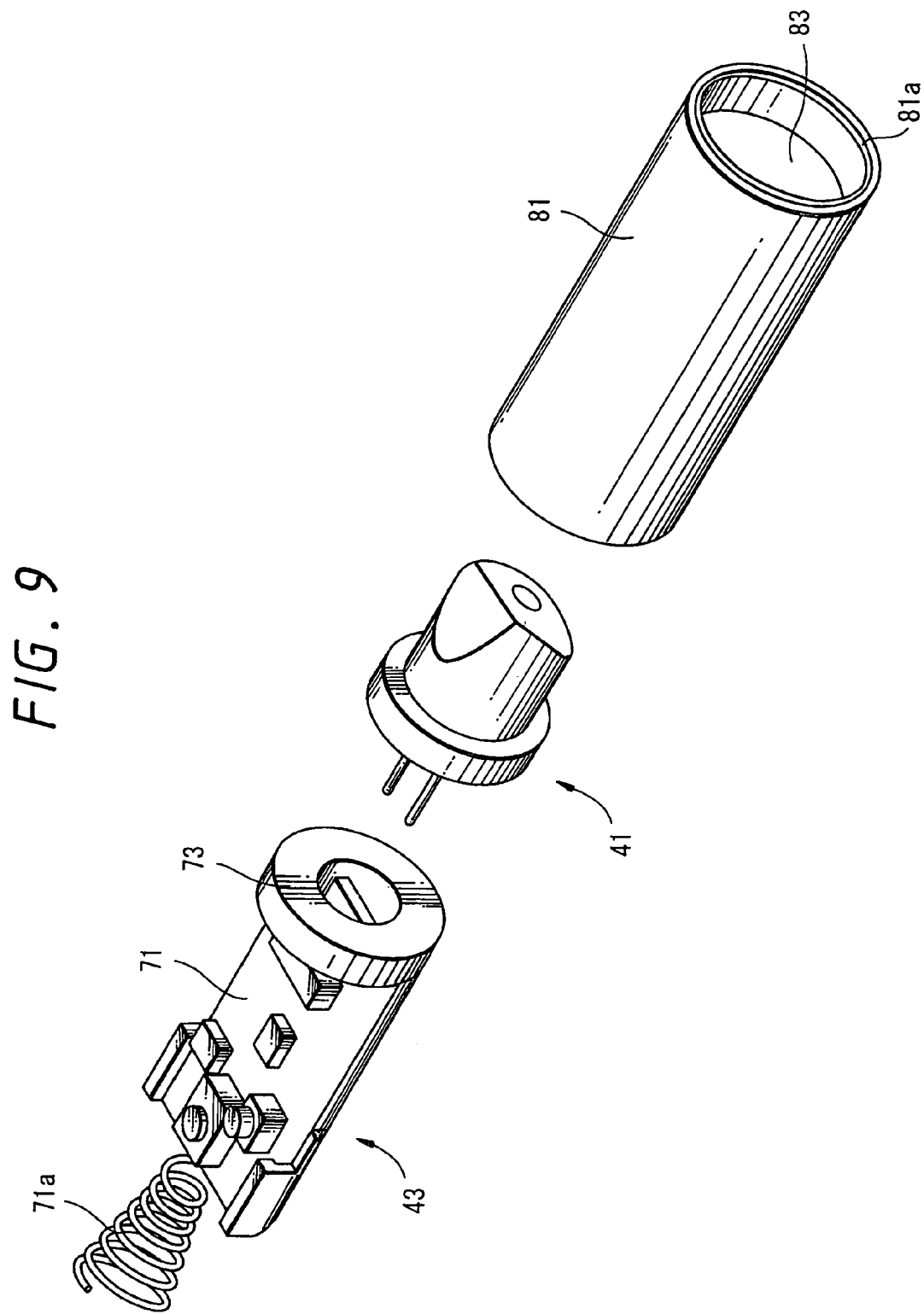
FIG. 9 is an exploded perspective view showing the structure of the laser pointer which is an example of the light irradiation apparatus.
Figure 10:
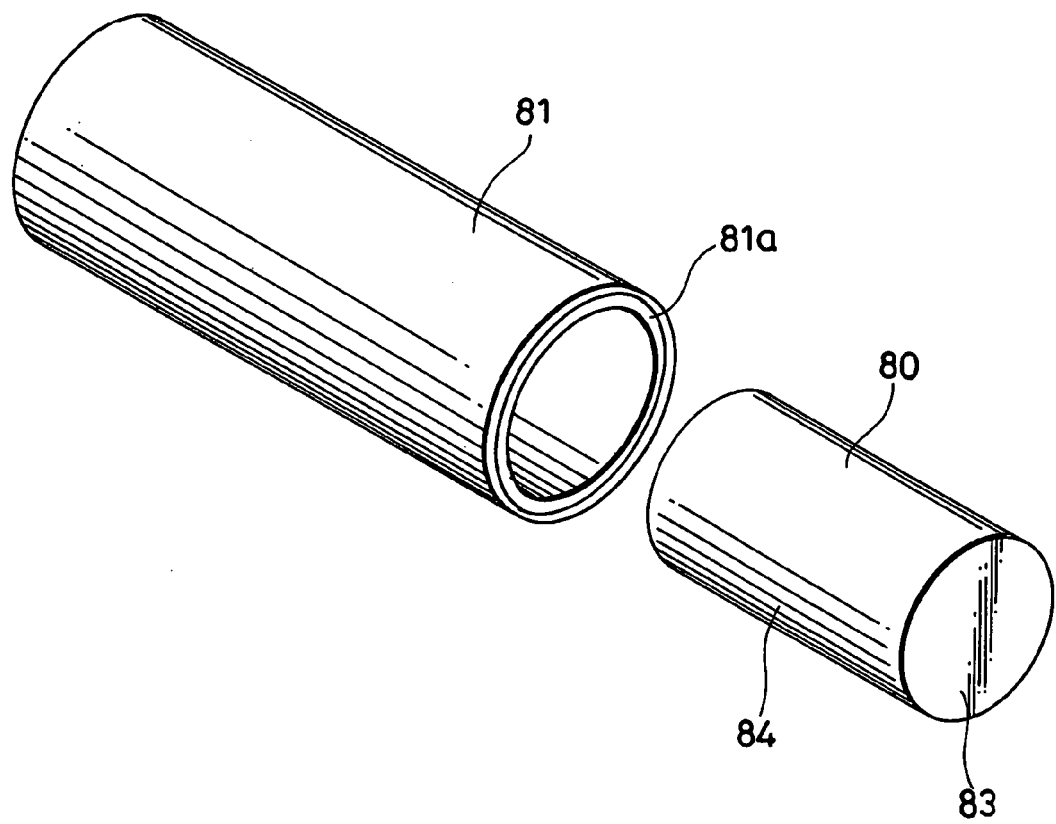
FIG. 10 is an exploded perspective view showing a state in which a lens is removed from a lens holder.

FIG. 8 is a cross-sectional view showing a structure of a laser pointer 40, and FIG. 9 is a cross-sectional perspective view of the laser pointer 40. As shown in FIGS. 8 and 9, the laser pointer 40 includes: a laser light emitting module 41 as a light projecting means; a lens 80 which expands the diameter of incident light projected from the laser light emitting module 41 to be projected as approximately collimated light; a lens holder which accommodates the lens 80; and a driver portion 43 which drives the laser pointer 40. FIG. 10 is an exploded perspective view showing a state in which the lens 80 is removed from the lens holder 81. As shown in FIGS. 8 through 10, the lens 80 has approximately cylindrical shape, and includes: a concave lens portion 82 as a light diameter expanding means; a convex lens portion 83 as a light collimating means; and a lens unit 84 in which the concave lens portion 82 and the convex lens portion 83 are integrally formed.

The concave lens portion 82 is formed on the incident side where the incident light enters the lens 80. The concave lens portion 82 is a concave lens directly formed in the lens unit 84 and constitutes the lens 80 integrally formed with the lens unit 84 and the convex lens 83. Accordingly, it is possible to simplify a manufacturing process of producing a concave lens and a convex lens in comparison to a case in which a lens is formed by joining individually produced concave lens and convex lens to be combined into one body with adhesive. Further, it becomes possible to reduce reflection of light at those joined surfaces and to efficiently project the light projected from the laser emitting module 41. For example, in case that an optical system is composed of two pieces of lens, boundary surfaces of respective lenses to the outside are to be four surfaces; however, the boundary surfaces can be reduced to two by integrally forming a concave lens and a convex lens, so that loss caused by the reflection of light on the surface of the lens can be reduced by half. Furthermore, the lens 80 is a lens having respective functions of a concave lens and a convex lens without requiring an adjustment with high accuracy of eccentricity, discrepancy of light axes, and uneven gap of lens surfaces between the concave lens and the convex lens.

The concave lens portion 82 is formed in an end surface 5 of the lens unit 84 to have a predetermined curvature by a processing method conventionally used when an optical lens is processed. Further, when an organic polymer material such as plastic is used as an optical material constituting the lens 80, it is possible to form the lens 80 with high accuracy, in which the concave lens portion 82 and the convex lens portion 83 are integrally formed by high-precision processing of a mold for forming the optical material into the shape of lens and by management of molding conditions. Accordingly, when a concave lens and a convex lens are produced with high accuracy, it is possible to reduce the eccentricity, discrepancy of light axes, and uneven gap of lens surfaces which occur in case of forming a lens by combining those lenses to become one body. Further, according to the lens 80 in which the concave lens portion 82 and the convex lens portion 83 are formed integrally in the lens unit 84, it is unnecessary to individually adjust curvature of each lens in response to dispersion in refractive index of the concave lens and the convex lens which are formed individually. Also, since the concave lens portion 82 and the convex lens portion 83 are formed integrally, a position shift of the lens does not occur even when a shock is given to the laser pointer 40; therefore it is possible to provide the laser pointer which has excellent optical characteristics and also has a high reliability by forming the concave lens portion 82 and the convex lens portion 83 in predetermined positions at the time of manufacturing the lens 80.

The concave lens portion 82 is formed approximately in the center of the end surface of the lens 80 facing the laser emitting module 41 such that in the lens unit 84 a light axis of the concave lens portion 82 and a light axis of the convex lens portion 83 coincide with each other. The concave lens portion 82 may be either a spherical surface lens or a non-spherical surface lens as long as it is a concave lens capable of refracting incident light to expand the diameter thereof. Further, the concave lens portion 82 is formed in a part of the end surface which is the side where incident light enters. Furthermore, curvature of the concave lens portion 82 is adjusted to correspond to curvature of the convex lens portion 83 so that the diameter of incident light is expanded to be projected from the convex lens portion 83 as approximately collimated light having a light path approximately parallel to light axes of the concave lens portion 82 and convex lens portion 83. The curvature of concave lens portion 82 is adjusted so that a focal point of the concave lens portion 82 and a focal point of the convex lens portion 83 coincide with each other, and light the diameter of which is expanded by the concave lens portion 82 can be projected from the convex lens portion 83 as approximately collimated light. In other words, when light is irradiated on a distant object, the diameter of light projected from the laser pointer 40 is rarely expanded and the light can be irradiated on the aimed object.

The convex lens portion 83 is formed on the projecting side where approximately collimated light is projected from the lens 41. That is, the convex lens portion 83 is formed on the projection side where incident light the diameter of which is expanded by the concave lens portion 82 is projected as approximately collimated light from the lens 80. Approximately collimated light projected from the convex lens portion 83 has a light path approximately parallel to the light axes of the concave lens portion 82 and the convex lens portion 83. The convex lens portion 83 is a convex lens directly formed in the lens unit 84, in which the lens unit 84 and the convex lens portion 83 are integrally formed.

The convex lens portion 83 is formed on the opposite side to the laser emitting module 41 with respect to the lens unit 84 to have a predetermined curvature by a processing method conventionally used at the time of processing an optical lens. Also, the convex lens portion 83 can be formed together with the concave lens portion 82, when the concave lens portion 82 is formed in the lens unit 84. Accordingly, it is possible to simplify a manufacturing process of producing a concave lens and a convex lens in comparison to a case in which a lens is formed by joining individually produced concave lens and convex lens to be combined into one body with adhesive. Furthermore, reflection of light can be reduced at joining surfaces where the concave lens and the convex lens are joined with adhesive, and approximately collimated light can be projected efficiently without attenuating the incident light.

The convex lens portion 83 is formed in the whole end portion of the lens unit 84, and the light axes of the concave lens portion 82 and convex lens portion 83 coincide with each other. The convex lens portion 83 may be formed partially in the central part of the end portion of the lens unit 84 as long as a necessary effective diameter can be secured. Also, the convex lens portion 83 may be either a spherical surface lens or a non-spherical surface lens as long as it is a convex lens capable of projecting light the diameter of which is expanded by the concave lens portion 82 as approximately collimated light. Furthermore, curvature of the convex lens portion 83 is adjusted to correspond to curvature of the concave lens portion 82 so that light the diameter of which is expanded by the concave lens portion 82 can be projected as approximately collimated light.

Since the concave lens portion 82 and the convex lens portion 83 are integrally formed in the lens unit 84, with respect to the lens 80 it is not necessary to perform positioning or the like with high accuracy when the lens is combined, and it is possible to reduce manufacturing costs of the lens 80. Furthermore, the number of parts can be reduced and therefore it becomes possible to reduce the manufacturing costs of the laser pointer 40 of this embodiment.

Moreover, the lens 80 can also be provided with an optical filter which absorbs light of a specific wavelength. By using a material which absorbs light of the specific wavelength as the material to form the lens 80, it is possible to project from the lens 80 the light having light of the specific wavelength removed as approximately collimated light. Particularly, by forming the lens 80 with a material such as an IR cut filter which absorbs light around an infrared spectrum, infrared light projected from an SHG laser light emitting module consisting of a laser diode, a solid-state laser, and a non-linear element can be absorbed, an unnecessary infrared laser light which is not visibly recognizable can be removed by the lens 80, and safety can be secured without disposing the IR cut filter separately. Furthermore, at least either of the concave lens portion 82 or the convex lens portion 83 can be also coated with the material which removes the above described light of the specific wavelength.

The lens holder 81 has the size capable of accommodating the lens 80 therein, and a light reflection preventing means 81a is formed on the inside surface of the lens holder 81 which is in contact with the lens 80. The light reflection preventing means 81a reduces diffused reflection of light in the lens unit 84 and is capable of narrowing light intensity distribution of light projected from the convex lens portion 83; and diffused reflection of light can be reduced, for example, by covering the circumferential surface of the lens unit 84 with a light absorption member. Further, by adjusting an area of the light reflection preventing means 81a which covers the circumferential surface of the lens unit 84, it is also possible to irradiate an object with light projected from the lens 80 such that the projected light has a predetermined light intensity distribution. For example, by forming in advance the light reflection preventing means 81a which is adjusted to have a predetermined area, the light intensity distribution can be adjusted according to the area thereof. Further, by making the lens holder 81 have a structure capable of sliding with respect to the lens unit 84, it is possible to alter the light intensity distribution without constraint. Thus, it is possible to point the object with light intensity distribution in accordance with user's preference by adjusting the area where the light reflection preventing means 81a covers the circumferential surface of the lens unit 84. Moreover, the light reflection preventing means can also be formed in the end surface where the lens 80 faces the laser light emitting module. Furthermore, it is also possible to form beforehand the light reflection preventing means in the circumferential surface of the lens unit 84 and in the end surface of the lens 80 excluding the concave lens portion 82, and diffused reflection of the light can also be reduced, for example, by applying black coating.

An inside diameter of the lens holder 81 is approximately the same as those of the laser light emitting module 41, a light emitting module sustaining portion 73, and the lens 80. The laser light emitting module 41, the light emitting module sustaining portion 73, and the lens 80 are disposed fixedly inside the lens holder 81.

The lens holder 81 is formed of a material having high thermal conductivity, that is for example copper, and when the laser light emitting module 41 is fixed inside the lens holder 81, a heat sink 52 and the lens holder 81 are fixed with adhesive having high thermal conductivity. Hence, heat generated in a laser diode 54 and an optical resonator 55 inside the laser light emitting module 41 can be conducted to the lens holder 81 through the heat sink 52 to be dissipated efficiently. As mentioned above, by efficiently performing the heat dissipation of the laser diode 54 or the optical resonator 55 to stabilize a temperature of the laser diode 54 or the optical resonator 55, it becomes possible to improve light emitting efficiency of laser light and to continually emit light having a stable output. Moreover, since the stable output can be obtained without using a complicated control system for temperature control, it is also possible to reduce the number of parts and to attain a reduction in costs.

Figure 11:
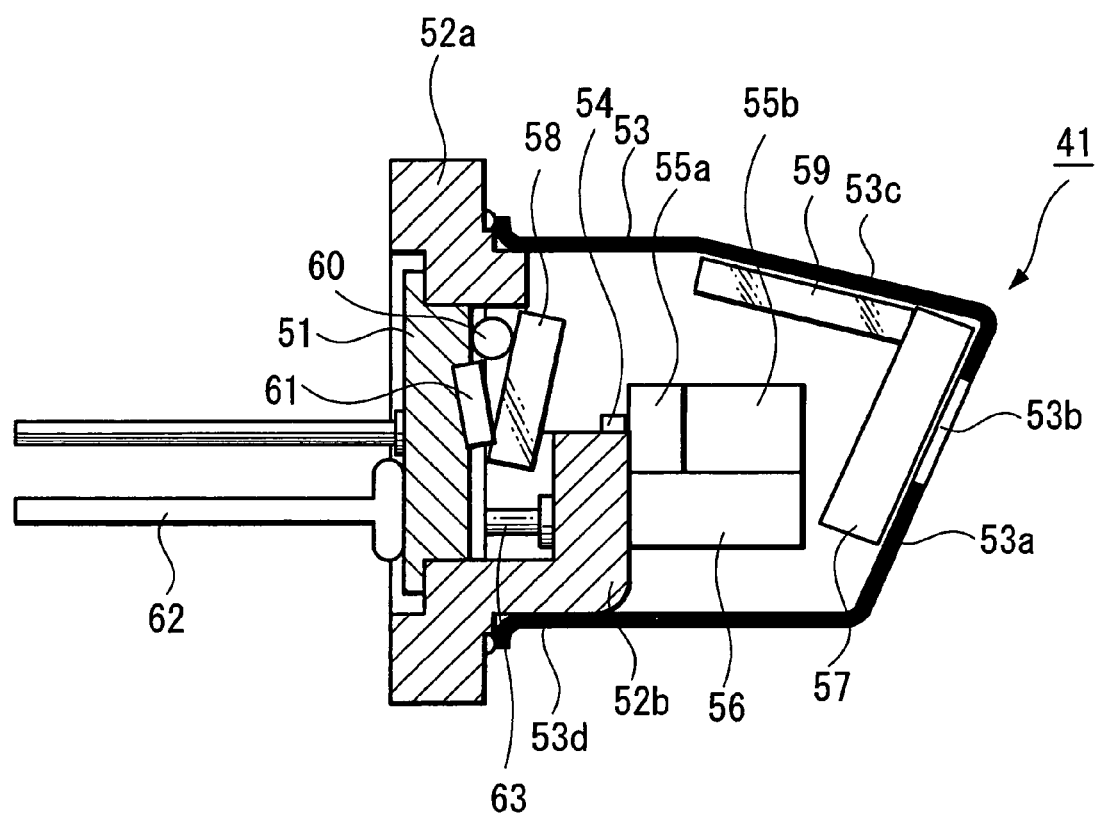
FIG. 11 is a cross-sectional diagram showing a structure of a laser light emitting module.
Figure 12:
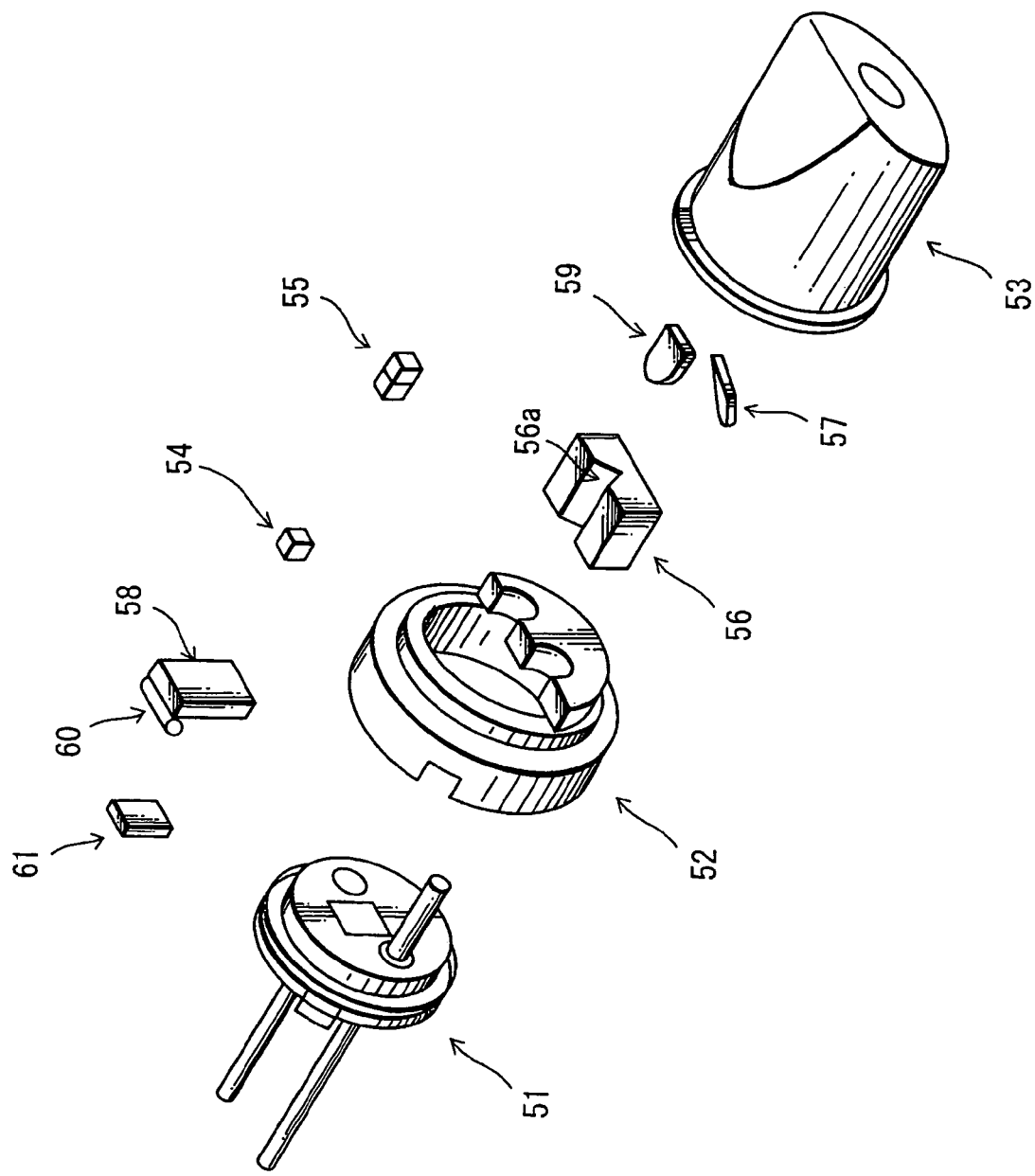
FIG. 12 is an exploded perspective view showing the structure of the laser light emitting module.

Then, the laser light emitting module 41 is explained referring to FIGS. 11 and 12. FIG. 11 is a cross-sectional view showing a structure of the laser light emitting module 41, and FIG. 12 is an exploded perspective view. An outer shape of the laser light emitting module 41 is composed of a header 51 to which a laser diode is attached, a heat sink 52 which conducts heat to the outside to be dissipated, and a window cap 53 which protects the inside of the module. The window cap 53 accommodates therein a laser diode 54 which emits light to excite a solid-state laser medium, an optical resonator 55 which converts a wavelength of laser light, a base member 56 which fixes and retains the optical resonator 55, optical filters 57, 58 which select a wavelength of laser light, a reflex mirror 59 which reflects light toward a laser light photo-diode side, a spacer 60 which retains space between the photo-diode and the optical filter 58, and a photo-diode 61 which converts the intensity of laser light into an electrical signal.

The header 51 is a member having an approximately disk-like shape, in which two disks having different diameters are joined to form the outer shape. The disk having a smaller diameter is disposed facing the inside of the laser light emitting module 41 and is engaged with the adjacent heat sink 52 to be connected. A contact part of the heat sink 52 and the header 51 is joined so as to maintain air-tightness, and air is prevented from going in and out through the contact part. Moreover, an outside terminal 62 and an inside terminal 63 are formed in the header 51, and it is possible to supply an electric current from the outside of the laser light emitting module 41 to the inside, because the outside terminal 62 and the inside terminal 63 are electrically connected.

The heat sink 52 is a member having a shape in which a flange-shaped portion 52a and a base portion 52b are integrally formed. The heat sink 52 is provided to be in contact with the base member 56, which sustains the optical resonator 55, and the laser diode 54; is the member to conduct and dissipate heat generated by the laser diode 54 and the optical resonator 55 to the outside of the module; and is formed of metal having high thermal conductivity or the like, such as copper for example.

An outside diameter of the flange-shaped part 52a is the largest diameter of the laser light emitting module 41, and its outer circumferential surface is exposed to a module surface. An inside diameter of the flange-shaped part 52a is of a size with which the header 51 can be engaged, and the header 51 is engaged therewith and joined to maintain air-tightness of the contact part. The base portion 52b has a semi-cylindrical shape in which a cylinder is divided in the direction of its central axis, and is formed to cover a bottom half of the flange-shaped part 52a as shown in the figure. Also, the laser diode 54 is attached to the base portion 52b so that the laser diode 54 can be retained at a position of a central axis of the window cap 53. Also, the base portion 52b is accommodated within the window cap 53 when the window cap 53 is attached to the heat sink 52.

The window cap 53 is a member having a shape, in which a side wall 53d having an approximately cylindrical shape, a slant opening surface 53a obliquely formed to the central axis of the cylinder, and a slant side plane 53c are provided. One side of the window cap 53 that is the heat sink 52 side is open, and on the opposite side to the heat sink 52 the slant opening surface 53a is obliquely formed with respect to the central axis of the side wall 53d, and a window portion 53b is made open in the slant opening surface 53a. Also, a part of 53d bends in the direction of the central axis and forms the slant side plane 53c which is a slant plane to the central axis. Although the slant opening surface 53a and the slant side plane 53c intersect to form L-shape, an angle at which two planes intersect is not necessarily orthogonal. Moreover, the angle at which two planes intersect is formed to maintain a position and an angular relation, in which laser light reflected by the optical filter 57 formed on the slant opening surface 53a as later explained is further reflected by the reflex mirror 59 formed on the slant side plane 53c so that the light can be made to enter the photo-diode 61.

A diameter of the side wall of the window cap 53 is of a size capable of accommodating the base portion 52b of the heat sink 52, and it is possible to accommodate the optical resonator 55, the base member 56, the optical filters 57, 58, the reflex mirror 59, the spacer 60, and the photo-diode 61 which are mentioned later inside the window cap 53. Moreover, since the heat sink 52 and the base member 56 are formed inside the window cap 53 unevenly distributed in the lower part of FIG. 8, there is no member disposed in the upper part inside the window cap 53 of FIG. 8 and the space is secured.

The open side of the window cap 53 is joined to the flange-shape part 52a of the heat sink 52, and the air-tightness is maintained at the joining part. Although various methods can be used for joining, air-tightness may well be secured by performing nickel plating on the surface of the heat sink 52 to join the window cap 53 and the heat sink 52 using a required welding method.

The window portion 53b is an opening which is formed in the slant opening surface 53a of the window cap 53, and functions as a light extraction opening for taking out light generated inside the laser light emitting module 41 to the outside of the module. Since the window portion 53b is the opening to take out laser light, it is formed on a path of the laser light projected from the inside of the module and is located approximately in the center of the slant opening surface 53a of the window cap 53. Although the window portion 53b is the opening of an approximately circular shape in the drawing, the shape is not limited thereto if the laser light projected from the inside of the module can be taken to the outside. Moreover, a size of the window portion 53b does not matter either if it is a size capable of projecting the laser light from the inside of the module. Further, the optical filter 57, which is later described, is attached to the window portion 53b, so that the air-tightness can be secured.

Since the window cap 53 is a member for the purpose of protecting each member accommodated inside, it is desirable to have rigidity to some extent that can bear pressure produced when handling conventional electronic parts. Also, since the window cap 53 is joined to the heat sink 52, it is desirable that the window cap 53 is formed of a material having high thermal conductivity so that heat conducted by the heat sink 52 can be dissipated efficiently to the outside of the module. Moreover, the window cap 53 needs to have light blocking characteristics so that the position for taking out the light generated inside the laser light emitting module 41 to the outside can be limited to the window portion 53b.

The laser diode 54 is an element which oscillates a laser light of a predetermined wavelength when a voltage is applied, for example, a semiconductor laser element made of gallium-aluminum arsenic (GaAlAs). In this embodiment, an element which oscillates laser light having a wavelength of 808 nm is used. The laser diode 54 is disposed in contact with the base portion 52b of the heat sink 52. At this time, a light emitting side of the laser diode 54 is disposed opposing in the direction of the window portion 53b formed in the window cap 53 and is disposed in the vicinity of an end surface of the base portion 52b on the window portion 53b side in order to make a distance from the optical resonator 55 small.

Further, though not illustrated, the laser diode 54 is electrically connected to the inside terminal 63 and oscillates the laser light having the wavelength of 808 nm in accordance with the voltage applied to the outside terminal 62. The laser diode 54 conducts heat generated at the time of the emission of laser light to the heat sink 52 so as to dissipate the heat from the heat sink 52 to the outside of the module. Due to the above, the laser diode 54 and the base portion 52b of the heat sink 52 need to be contacted using adhesive having high thermal conductivity, and preferably a silver paste is used, for example.

The optical resonator 55 is a member which converts the wavelength of laser light emitted from the laser diode 54 to emit laser light having a different wavelength, and has a structure in which a solid-state laser medium 55a and a non-linear optical element 55b are joined to be held between dichroic coats which reflect light of a predetermined wavelength. The optical resonator 55 is sustained by the base member 56, the solid-state laser medium 55a is disposed adjacent to the laser diode 54, and the non-linear optical element 55b is disposed near the central axis of the window cap 53 on the window portion 53b side. At this time, the optical resonator 55 and the laser diode 54 are not in contact with each other and are disposed having a gap of around several μm.

A mechanism in which the optical resonator 55 converts a wavelength of incident laser light and projects laser light having a different wavelength is known as a Second Harmonic Generation (SHG). In this embodiment, Nd:YVO$_4$ is used as the solid-state laser medium and Potassium Titanyle Phosphate (KTiOPO$_4$: hereinafter referred to as KTP) is used as the non-linear optical element; however, the optical resonator 55 may be made of other materials. The laser light having the wavelength of 808 nm oscillated from the laser diode 54 enters the solid-state laser medium 55a to excite an electronic state of the solid-state laser medium 55a, and the solid-state laser medium 55a emits light having a wavelength of 1064 nm. The light having the wavelength of 1064 nm emitted from the solid-state laser medium 55a enters the non-linear optical element 55b in which the wavelength thereof is further converted to be emitted from the optical resonator 55 as laser light having a wavelength of 532 nm.

Since the light emitted by the laser diode 54 has a large spread angle, the light of 808 nm projected from the laser diode 54 expands the diameter thereof before it reaches the solid-state laser medium 55a and an energy density per unit area becomes low. Therefore, it is important that the light emitting surface of the laser diode 54 and an end surface of the solid-state laser medium 55a are to be as close as possible so that efficiency of exciting the light having the wavelength of 1064 nm in the solid-state laser medium 55a can be improved.

The base member 56 is a member to fix the optical resonator 55 and to conduct heat generated in the optical resonator 55 to the heat sink 52. Accordingly, it is desirable to form the base member 56 with a material having high thermal conductivity, for example, copper. The base member 56 is a rectangular parallelepiped shape in which a rectangle-shaped groove portion 56a is formed, and engages the optical resonator 55 with the groove portion 56a to be sustained and further the base member 56 is disposed in contact with the base portion 52b of the heat sink 52. Accordingly, heat generated by the optical resonator 55 is conducted to the heat sink 52 and the optical resonator 55 can be made adjacent to the laser diode 54 which is sustained by the base portion 52b.

Further, it is desirable to use adhesive having high thermal conductivity for joining the optical resonator 55 to the base member 56 so that heat of the optical resonator 55 can be conducted efficiently to the base member 56, and for example silver paste is preferable. Furthermore, it is also desirable to use adhesive having high thermal conductivity for joining the base member 56 to the heat sink 52, and for example silver paste is preferable. As an alternative, the heat sink 52 and the base member 56 may be integrally formed.

The optical filter 57 is a flat plate member having approximately the same shape as the slant opening surface 53a and is disposed in close contact with the slant opening surface 53a to secure air-tightness at the window portion 53b. In order to secure the air-tightness at the window portion 53b, an outer shape of the optical filter 57 is larger than an aperture of the window portion 53b, and the slant opening surface 53a of the window cap 53 and the optical filter 57 are joined with adhesive so as to secure the air-tightness. Since the slant opening surface 53a is formed obliquely with respect to the central axis of the side wall of the window cap 53, the optical filter 57 is also disposed obliquely with respect to the central axis and is further disposed obliquely with respect to the forward direction of the laser light projected from the optical resonator 55. Since the optical filter 57 is obliquely disposed with respect to the central axis which is mainly the forward direction of the laser light, it is possible to reflect a part of the laser light emitted from the optical resonator 55 in the direction of the reflex mirror 59 by the optical filter 57.

The optical filter 57 is a member which has an optical characteristic to absorb light of a predetermined wavelength. In this embodiment, material for the optical filter 57 is selected from the materials which shield the light having the wavelength of 808 nm emitted from the laser diode 54 and the light having the wavelength of 1064 nm emitted from the solid-state laser medium 55a by efficiently reflecting or absorbing, and which transmits the laser light having the wavelength of 532 nm converted by the non-linear optical element 55b. Since the optical filter 57 absorbs the light having the wavelength of 808 nm and having the wavelength of 1064 nm, the light projected from the inside of the window cap 53 to the outside by passing through the window portion 53b becomes a laser light of green color having a wavelength of 532 nm.

Further, when laser light emitted from the optical resonator 55 enters the optical filter 57, the laser light is partially reflected on the surface of the optical filter 57, because a refractive index of the air differs from that of the optical filter 57. The laser light reflected on the surface of the optical filter 57 is reflected in the direction of the slant side plane 53c and enters the reflex mirror 59 which is later described. A ratio of the laser light reflected on the surface of the optical filter 57 is determined according to the refractive index and a state of surface of the optical filter 57, and conventionally around 7% of the light is reflected. Since a part of the laser light is further reflected when entering the air from the optical filter 57, around 14% of the laser light is reflected on the reflex mirror 59 as a whole. It is also possible to have the ratio of the reflection light increased or decreased by applying coating to the surface of the optical filter 57. Further, the optical filter 57 may be the one formed with a dielectric substance, which selects a wavelength of a transmitting light, on a material such as a glass plate which transmits light.

The reflex mirror 59 is a member having approximately the same shape as that of the slant side plane 53c of the window cap 53 and functions as a mirror which reflects an incident light on the surface thereof. Since the reflex mirror 59 is formed on the slant side plane 53c, the reflex mirror 59 is also disposed obliquely with respect to the central axis of the window cap 53. The reflex mirror 59 may be formed by sticking a mirror on the slant side surface 53c, or a mirror surface may be formed directly on the slant side surface 53c so as to function as the reflex mirror 59. By forming the optical filter 57 on the slant opening surface 53a and by forming the reflex mirror 59 on the slant side surface 53c, a part of laser light reflected from the optical filter 57 is again reflected by the reflex mirror 59 and enters the photo-diode 61, which is later described, due to an effect of the angle between the slant opening surface 53a and the slant side plane 53c.

The optical filter 58 is a member having an optical characteristic to absorb light of a predetermined wavelength, and is disposed on a light path in which the light reflected from the reflex mirror 59 reaches the photo-diode 61. In this embodiment, the member is selected, in which efficiently absorbs light having the wavelength of 808 nm emitted from the laser diode 54 and light having the wavelength of 1064 nm emitted from the solid-state laser medium 55a and which transmits laser light having the wavelength of 532 nm converted by the non-linear optical element 55b. Since the optical filter 58 absorbs light having the wavelength of 808 nm and the wavelength of 1064 nm, light entering the photo-diode 61 is only green laser light having the wavelength of 532 nm among the light reflected on the surface of the optical filter 57 and on the reflex mirror 59. Also, a dielectric substance may be formed on a light receiving plane of the photo-diode 61 so as to select a wavelength of transmitting light, other than disposing the optical filter 58 in front of the light receiving plane of the photo-diode 61 to select a wavelength of light which is received by the photo-diode 61.

The spacer 60 is a member having a cylindrical shape which is attached to secure a space between the photo-diode 61 and the optical filter 58. The optical filter 58 is sustained by the spacer 60 and a space is secured between the photo-diode 61 and the optical filter 58 to form electric wiring therein.

The photo-diode 61 is an element which converts light irradiated on the light receiving plane into an electric signal corresponding to the intensity of the light. Although not illustrated, electric wiring is formed in the photo-diode 61 to electrically connect to the inside terminal 63 through the electric wiring, and the electric signal which is converted from the intensity of the received light is transmitted to the outside terminal 62. Light received by the photo-diode 61 is the light, which is reflected on the surface of the optical filter 57, again reflected on the reflex mirror 59, and is transmitted through the optical filter 58, among the light projected from the optical resonator 55. Accordingly, the photo-diode 61 is sustained by the header 51 and is disposed at the position which can receive the light transmitted through the optical filter 58. Since the light received by the photo-diode 61 is a part of light emitted by the optical resonator 55, it becomes possible to obtain the intensity of laser light projected from the window portion 53b by calculation based on the intensity of light received by the photo-diode 61.

Electrical connection between the inside terminal 63 and the photo-diode 61 can be made easily by disposing the photo-diode 61 on the header 51, and also the photo-diode 61 is disposed in the back of the laser diode 54 to make the laser light emitting module 41 small-sized.

When each member is accommodated and disposed in the window cap 53, an assembly is performed under an environment of clean dry air such as in a clean room. At the time of assembling, the inside of the laser light emitting module 41 is completely sealed hermetically in order to secure the air-tightness between the window portion 53b of the window cap 53 and the optical filter 57, to secure the air-tightness between the window cap 53 and the heat sink 52, and to secure the air-tightness between the heat sink 52 and the header 51. By hermetically sealing the inside of the module with dry air whose dew point is around −40° C., it is possible to prevent dirt from adhering to the laser diode 54 and the optical resonator 55 which are disposed in the module, and to prevent dew condensation thereof under a low temperature environment. Accordingly, it becomes possible to realize a longer operating life, a reduction in failure rate, and an improvement of a yield ratio of the laser diode 54 and the optical resonator 55, and the reliability of the laser light emitting module 41 can be improved. An inactive gas such as nitrogen may be sealed instead of air.

Figure 13:
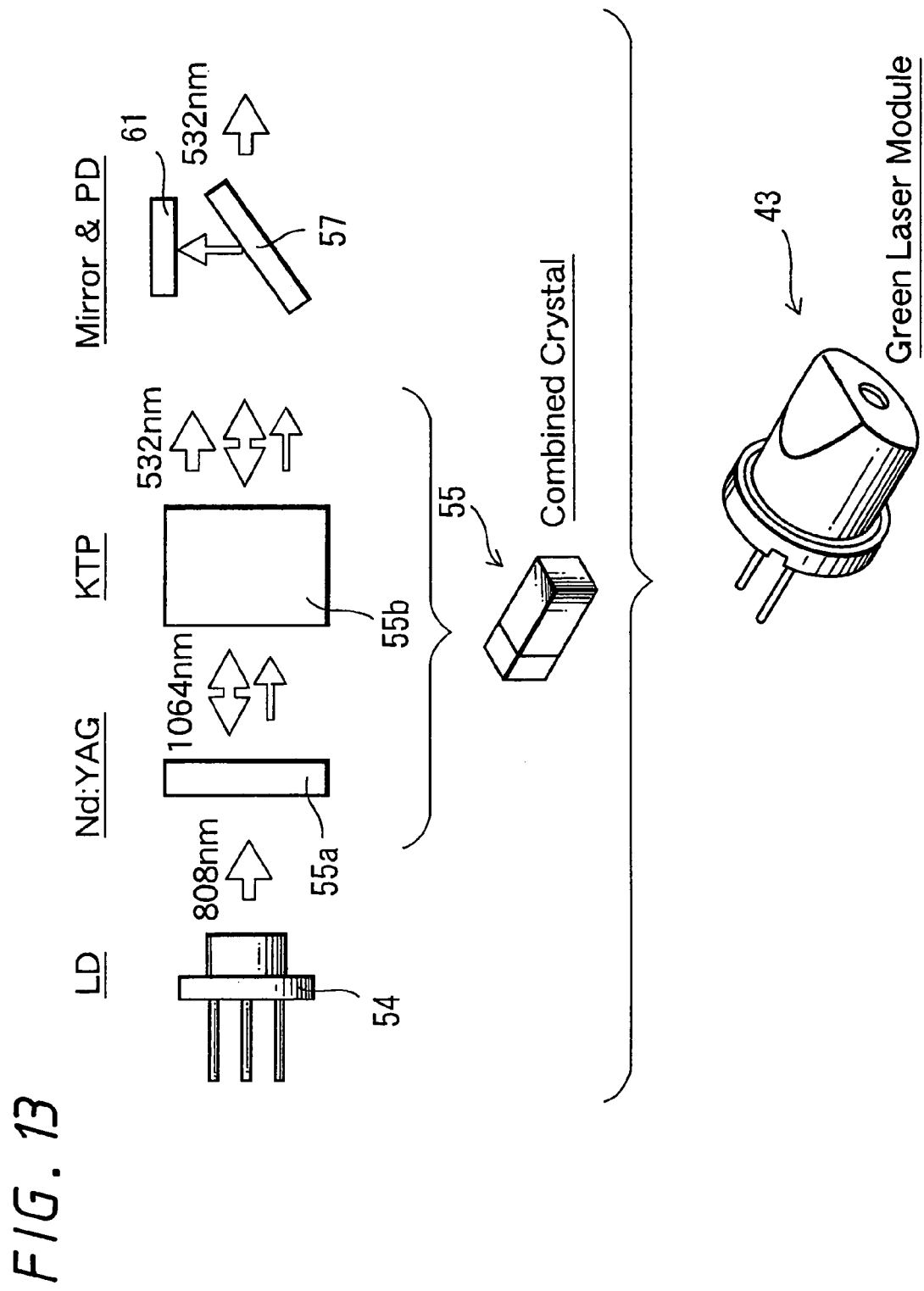
FIG. 13 is a schematic diagram to explain conversion of a wavelength of light performed in the laser light emitting module by SHG with indicating a wavelength in each part.

FIG. 13 is a diagram schematically showing changes in wavelength of light between respective members inside the laser light emitting module 41 shown in FIGS. 11 and 12. Laser light having the wavelength of 808 nm oscillated by the laser diode 54 passes through the solid-state laser medium 55a, and light having the wavelength of 1064 nm is generated. At this time, a part of light having the wavelength of 808 nm emitted from the laser diode 54 is also not converted and the lights having two different wavelengths reach the non-linear optical element 55b. In the non-linear optical element 55b, a part of light having the wavelength of 1064 nm is converted into the wavelength of 532 nm, but the light having the wavelength of 1064 nm and the light having the wavelength of 808 nm are projected to the outside of the optical resonator 55.

A part of light having three different wavelengths projected from the optical resonator 55 is reflected on the surface of the optical filter 57 and reaches the optical diode 61. Also, light having the wavelength of 1064 nm and light having the wavelength of 808 nm are absorbed among the light transmitted through the optical filter 57 and only the laser light having the wavelength of 532 nm is projected to the outside of the laser light emitting module 41.

Figure 14:
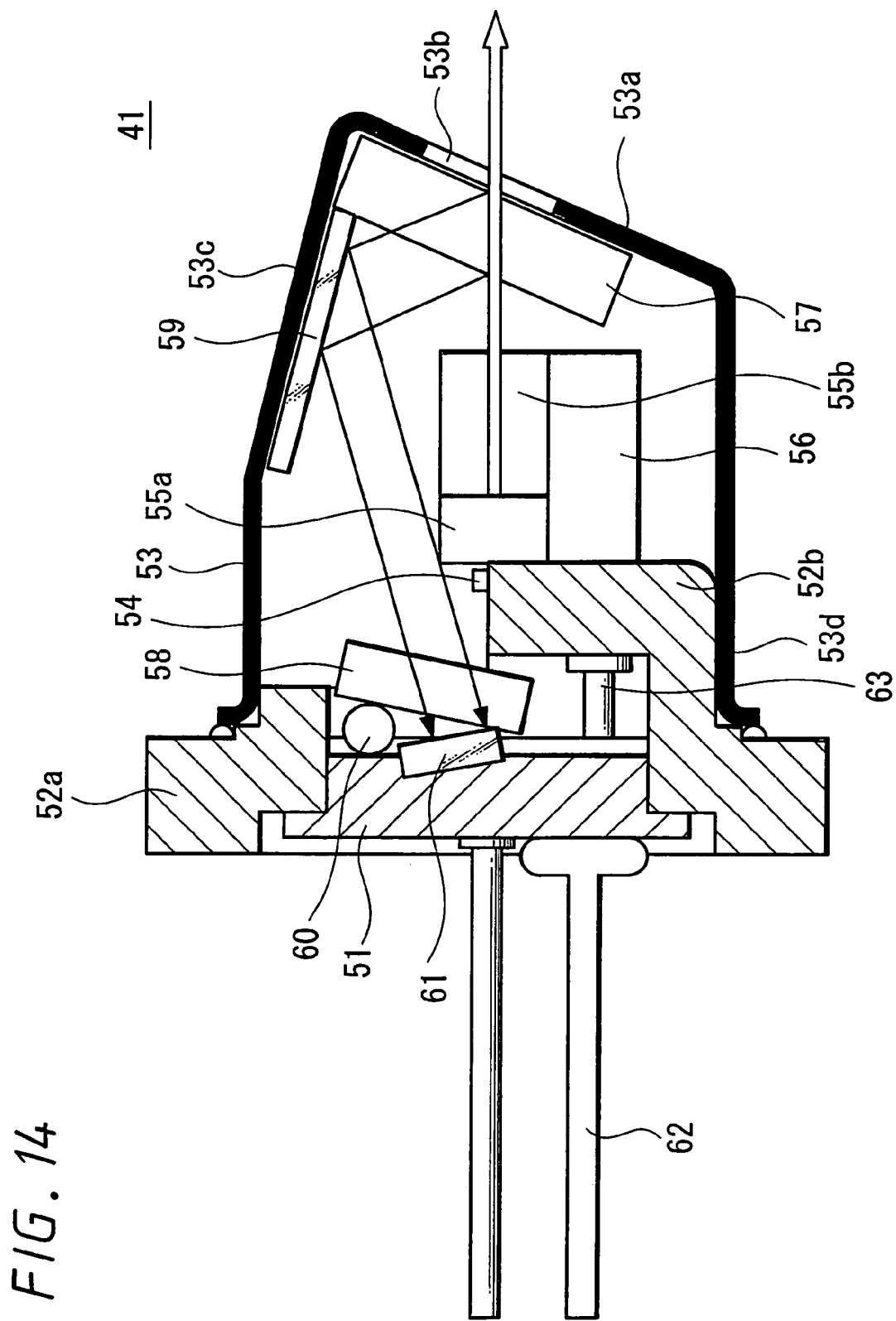
FIG. 14 is a schematic diagram showing a light path in the laser light emitting module.

FIG. 14 is a schematic diagram showing a path of laser light inside the laser light emitting module 41. A light having a wavelength converted by SHG is generated in the optical resonator 55 by the light emitted from the laser diode 54, and a path of the laser light which is projected to the outside of the laser light emitting module 41 from the window portion 53b and a path of the light which is reflected by the optical filter 57 and reaches the photo-diode 61 are shown by arrows.

Three kinds of light having the wavelengths of 808 nm, 1064 nm, and 532 nm are projected from the optical resonator 55 as explained using FIG. 12. The light projected from the optical resonator 55 advances along the central axis of the window cap 53 and enters the optical filter 57. At this time, a part of the light is reflected in the direction of the reflex mirror 59 due to the difference in refractive index between the optical filter 57 and air as mentioned above. Accordingly, three kinds of light having different wavelengths are reflected on the surface of the optical filter 57 and are also reflected by the reflex mirror 59 and advance in the direction of the photo-diode 61. Since the optical filter 58 is disposed in front of a light receiving plane of the photo-diode 61, light having wavelength of 808 nm and light having wavelength of 1064 nm among the three kinds of light having different wavelengths are absorbed by the optical filter 58 and only light having the wavelength of 532 nm reaches the photo-diode 61.

A part of light which passes through the optical filter 57 is further reflected in the direction of the reflex mirror 59 on a surface where the light is projected to the air from the optical filter 57; is reflected again by the reflex mirror 59; passes through the optical filter 58; and reaches the photo-diode 61. Since the light passes through the optical filter 57 and the optical filter 58, the wavelength of light which reaches the photo-diode 61 only becomes 532 nm. Inside the window cap 53, since the base portion 52b of the heat sink 52, the base member 56 and the like are unevenly disposed in the lower part as shown in the drawing, space is secured in the upper part shown in the drawing. Accordingly, the light reflected by the reflex mirror 59 is transmitted through the space portion and can reach the photo-diode 61, even if the photo-diode 61 is disposed on the header 51.

Also, since the light having the wavelength of 808 nm and the light having the wavelength of 1064 nm have been absorbed by the optical filter 57, only the light having the wavelength of 532 nm becomes the light which passes through the optical filter 57 to be projected from the window portion 53b to the outside of the laser light emitting module 41. Since a ratio of the light reflected by the optical filter 57 is determined by a material of the optical filter 57 or a state of surface thereof, the intensity of light projected from the window portion 53b can be calculated by detecting the intensity of light which is received by the photo-diode 61.

Then, in case that an angle formed by the forward direction of mainly proceeding light and the slant opening surface 53a is close to a right angle, an angle formed by the forward direction of the light and the optical filter 57 also becomes close to a right angle, and therefore, a part of light reflected by the optical filter 57 reaches the optical resonator 55, the reached light is further reflected on the surface of the optical resonator 55 and returns to the optical filter 57. Thus, since the light reflected in multiple times between the optical filter 57 and the optical resonator 55 passes through the optical filter 57 to be projected from the window portion 53b, the laser light projected from the laser light emitting module 41 has a plurality of paths and results in drawing multiple points. Accordingly, by adjusting the angle formed by the main forward direction of the light and the slant opening surface 53a such that the reflected light from the optical filter 57 can not reach the optical resonator 55, the multiple reflection is prevented between the optical filter 57 and the optical resonator 55 and the laser light projected from the window portion 53b can be restricted to one single point. In other word, an incident light which enters the lens 80 can be projected from the laser light emitting module 41 as approximately collimated light having the expansion of the diameter thereof controlled.

Since light having the wavelength of 532 nm is recognized as green light by an observer's vision and has higher relative visibility than red laser light close to an infrared ray, the green laser light has better visibility than red, when outputted with a similar output level to the red laser light. Accordingly, even in the case where the output is lowered to reduce a possibility of causing influence on a human body, excellent visibility can be secured.

Also, since a light emitting characteristic and a wavelength conversion characteristic are dependent on temperature with respect to either of the laser diode 54, the solid-state laser medium 55, and the non-linear optical element 55b when the wavelength is converted by SHG shown in FIG. 13, it is desirable that a temperature change in environment for the use is small. For example, it is desirable that a wavelength of light to efficiently excite the solid-state laser medium 55a is in the range of 808.6±2.0 nm when Nd:YVO$_4$ is used as the solid-state laser medium 55a; however, a wavelength of emitted light changes approximately 3 nm in case that an environmental temperature changes about 10° C., when the laser diode 54 is used. Moreover, the temperature of environment for the use of the solid-state laser medium 55a is also set to around 25° C. when performing cutout of a crystal, and therefore a light emitting efficiency of a short wavelength by SHG becomes low if the temperature change is great.

Therefore, as explained using FIG. 11, the laser diode 54 is joined to the heat sink 52 with a solder having high thermal conductivity, the optical resonator 55 is joined to the base member 56 with an adhesive having high thermal conductivity, and the heat sink 52 and the base member 56 are joined with adhesive having high thermal conductivity. Moreover, since the heat sink 52 and the base member 56 are also formed of metal having high thermal conductivity and the heat sink 52 is exposed to the surface of the laser light emitting module 41, heat generated in the laser diode 54 and the optical resonator 55 is dissipated efficiently to the outside by the base member 56 and the heat sink 52. Accordingly, in the laser light emitting module 41, it is possible to stabilize the temperature of environment for the use of the laser diode 54 and the optical resonator 55, and it is possible to efficiently emit the laser light having the wavelength of 532 nm, which is projected ultimately, to stabilize an output.

Subsequently, regarding the driver portion 43 explanation will be given with reference to FIG. 15. FIG. 15 is an exploded perspective view of the driver portion 43. The driver portion 43 is a member which is electrically connected to the laser light emitting module 41 and controls emission of light by applying a voltage to the laser light emitting module 41; and is composed of a circuit board 71, a driver sustaining portion 72, and a light emitting module sustaining portion 73.

The circuit board 71 is a substrate in which an electric circuit is formed, and is electrically connected to the outside terminal 62 of the laser light emitting module 41. As the electric circuit formed in the circuit board 71, there is an automatic light output control circuit (Auto Power Control: APC), for example. A power supply wiring 71a formed of a spring-shaped conductive member is attached to the circuit board 71. With connecting a power supply source such as a battery to the power supply wiring 71a, the power supply wiring 71a supplies an electric current to the circuit board 71 so as to drive the circuit board 71.

A part of laser light oscillated by the optical resonator 55 is reflected by the optical filter 57 and the reflex mirror 59, and the photo-diode 61 detects the intensity of the reflected light. The detected reflection light is converted into an electric signal in the photo-diode 61 and the electric signal showing the reflection light intensity is transmitted through the inside terminal 63 to the circuit board 71 from the outside terminal 62. The circuit board 71 controls the intensity of laser light oscillated by the laser light emitting module 41 by calculating the intensity of light projected from the window portion 53b based on the electric signal and by controlling the voltage supplied from the power supply. With the circuit board 71 which controls the light emitting intensity of the laser light emitting module 41 using the APC circuit, the intensity of laser light projected from the laser pointer can reliably be set below a fixed value, and it is possible to continuously emit a laser light at an output having less influence on a human body.

The driver sustaining portion 72 is a member constituting an outer shape of the driver portion 43 and fixedly sustains the circuit board 71 and the light emitting module sustaining portion 73. The driver sustaining portion 72 functions as a case which sustains a substrate portion of the circuit board 71 by having the substrate portion engaged with a groove portion 72a formed in the driver sustaining portion 72. The light emitting module sustaining portion 73 is a member which is attached fixedly to the driver sustaining portion 72 and the circuit board 71 to sustain the laser light emitting module 41 and the circuit board 71 in a state of securing an electric connection therebetween. The light emitting module sustaining portion 73 sustains the laser light emitting module 41 by having the substrate portion of the circuit board 71 engaged with the groove portion 72a which is formed in the driver sustaining portion 72, and is accommodated in the lens holder 81 in a state in which the laser light emitting module 41 is attached to the opposite side of the circuit board 71.

As described above, according to the lens of the present invention, since a process in which the light diameter expanding means and the light collimating means are individually formed and then formed into one body is not required, it is possible to control an eccentricity, a discrepancy of light axes, and an error in gap of lens surfaces due to a positioning discrepancy between the light diameter expanding means and the light collimating means; and it is possible to provide a integrally formed lens having two functions such as expanding the diameter of light and collimating light. Further, a manufacturing process can be simplified in comparison to a case in which a lens having the light diameter expanding means and a lens having the light collimating means are joined with adhesive by adjusting relative positions thereof with high accuracy to form a one lens body. Moreover, since the diameter of incident light is expanded and approximately collimated light is projected by one piece of lens, it is possible to reduce the number of part, which also leads to a reduction in manufacturing costs. Furthermore, it is possible to reduce the number of molds required to form respective lenses when a plurality of lenses are individually formed by molding to be combined into one body. Specifically, since there is only one mold required to integrally form the lens having functions of the light diameter expanding means and the light collimating means, it becomes possible to reduce an initial investment to form the lens having those plurality of functions.

Further, according to the lens of the present invention, light reflected on surfaces of the lens can be reduced in comparison to the case in which the lens as the light diameter expanding means and the lens as the light collimating means are formed individually and combined into one body, and it is possible to efficiently take out light to the outside of the lens since the loss caused on those surfaces can be controlled. Furthermore, diffused reflection of light which enters the lens can be reduced by a light reflection preventing means. Therefore, a distribution range of light intensity is controlled when light is irradiated on an object, and visibility of an irradiation area can be improved. Moreover, the expansion of the light intensity distribution can be made into a required distribution by adjusting diffused reflection of the light within the lens.

According to the light irradiation apparatus of the present invention, it is possible to simplify a manufacturing process of the light irradiation apparatus by integrally forming the light diameter expanding means and the light collimating means in a lens unit in comparison to the case in which the light diameter expanding means and the light collimating means are individually formed and combined, which also leads to reduction in manufacturing costs.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A light irradiation apparatus comprising:
   light projecting means for projecting light;
   a lens having light diameter expanding means for expanding a diameter of light projected from said light projecting means to be projected, light collimating means for receiving incident light having the diameter thereof expanded by said light diameter expanding means to be projected as approximately collimated light, and a lens unit in which said light diameter expanding means and said light collimating means are integrally formed,
   wherein said light projecting means is a laser light emitting module which projects laser light, and
   wherein said laser light emitting module comprises: a resonator comprising a solid-state laser medium, a non-linear optical element which converts a wavelength of light emitted from said solid-state laser medium, and a pair of resonance reflective portions between which said solid-state laser medium and said non-linear optical element are held to reciprocate light; a laser diode which emits light to excite said solid-state laser medium; and a window cap in which a window portion is formed to take out light projected from said resonator and which accommodates said resonator and said laser diode,
   the window cap being a single integrated component having:
      a sidewall portion having an approximately cylindrical shape, a portion of the sidewall portion having a bend in a direction toward the central axis of the sidewall portion to form a slant side plane portion of the sidewall portion;
      a slant opening surface obliquely formed to the central axis of the sidewall portion, the slant opening surface being bounded by the slant side plane portion and the sidewall portion, the slant opening surface having a window portion formed therethrough for taking out the light projected from the resonator.

2. The light irradiation apparatus according to claim 1, further comprising:
   a lens holder for accommodating said lens, wherein said lens holder includes a light reflection preventing means for reducing diffused reflection of the light projected from said light diameter expanding means.

3. The light irradiation apparatus according to claim 2, wherein
   said light reflection preventing means is a light absorption member formed inside said lens holder.

4. The light irradiation apparatus according to claim 3, wherein
   light intensity distribution of the light projected from said lens is adjusted by adjusting an area in which said light absorption member covers a circumferential surface of said lens unit.

5. The light irradiation apparatus according to claim 1, wherein
   light intensity distribution of the light projected from said lens is adjusted by adjusting an area of said window portion.

6. The light irradiation apparatus according to claim 1, wherein
   said lens unit comprises an optical filter which selects a wavelength of the light projected from said light projecting means.

7. The light irradiation apparatus according to claim 6, wherein
   said optical filter shields infrared light.

8. A laser pointer comprising:
   a laser light emitting module which includes: a solid-state laser medium; a non-linear optical element which converts a wavelength of light emitted from said solid-state laser medium; a resonator comprising a pair of resonance reflective portions between which said solid-state laser medium and said non-linear optical element are held so as to reciprocate light; a laser diode which emits light to excite said solid-state laser medium; and a window cap in which a window portion is formed to take out light projected from said resonator and which accommodates said resonator and said laser diode, and
   a lens which expands the diameter of light projected from said window portion to make approximately collimated light,
   wherein said lens has: light diameter expanding means for expanding a diameter of light projected from said window portion to be projected; light collimating means for receiving incident light having the diameter thereof expanded by said light diameter expanding means to be projected as approximately collimated light; and a lens unit in which said light diameter expanding means and said light collimating means are integrally formed, and
   wherein the window cap is a single integrated component having:
      a sidewall portion having an approximately cylindrical shape, a portion of the sidewall portion having a bend in a direction toward the central axis of the sidewall portion to form a slant side plane portion of the sidewall portion;
      a slant opening surface obliquely formed to the central axis of the sidewall portion, the slant opening surface being bounded by the slant side plane portion and the sidewall portion, the slant opening surface having a window portion formed therethrough for taking out the light projected from the resonator.

* * * * *